(12) United States Patent
Takase et al.

(10) Patent No.: US 8,207,239 B2
(45) Date of Patent: Jun. 26, 2012

(54) RADIOACTIVE RAY-CURABLE LIQUID RESIN COMPOSITION FOR USE IN OPTICAL STEREOLITHOGRAPHY, AND OPTICALLY SHAPED ARTICLE PRODUCED BY CURING THE COMPOSITION

(75) Inventors: Katsuyuki Takase, Tokyo (JP);
Takayoshi Tanabe, Tokyo (JP);
Noriyasu Shinohara, Tokyo (JP)

(73) Assignees: DSM IP Assets B.V., Heerlen (NL); JSR Corporation, Tokyo (JP); Japan Fine Coatings Co. Ltd., Ibaraki (JP)

( * ) Notice: Subject to any disclaimer, the term of this patent is extended or adjusted under 35 U.S.C. 154(b) by 0 days.

(21) Appl. No.: 13/317,375

(22) Filed: Oct. 17, 2011

(65) Prior Publication Data
US 2012/0041091 A1 Feb. 16, 2012

Related U.S. Application Data

(63) Continuation of application No. 11/917,632, filed as application No. PCT/JP2006/312147 on Jun. 16, 2006, now abandoned.

(30) Foreign Application Priority Data

Jun. 16, 2005 (JP) ................................. 2005-176080
Jun. 16, 2005 (JP) ................................. 2005-176236
Oct. 21, 2005 (JP) ................................. 2005-306855
Dec. 21, 2005 (JP) ................................. 2005-368066

(51) Int. Cl.
*C08L 63/00* (2006.01)
*C08G 2/02* (2006.01)
(52) U.S. Cl. .......................................... 522/25; 522/27
(58) Field of Classification Search .................... 522/25, 522/27
See application file for complete search history.

(56) References Cited

U.S. PATENT DOCUMENTS

| 4,530,746 A | 7/1985 | Azuma et al. |
| 6,685,869 B2 * | 2/2004 | Yamamura et al. ........... 264/401 |
| 7,709,598 B2 | 5/2010 | Kimura et al. |
| 7,781,495 B2 | 8/2010 | Okada et al. |

FOREIGN PATENT DOCUMENTS

| JP | 60-247515 | 12/1985 |
| JP | 62-35966 | 2/1987 |
| JP | 62-101408 | 5/1987 |
| JP | 01-204915 | 8/1989 |
| JP | 1-213304 | 8/1989 |
| JP | 2-28261 | 1/1990 |
| JP | 2-75618 | 3/1990 |
| JP | 2-208305 | 8/1990 |
| JP | 3-160013 | 7/1991 |
| JP | 5-24119 | 2/1993 |
| JP | 05-210343 | 8/1993 |
| JP | 6-228413 | 8/1994 |
| JP | 8-256062 | 10/1996 |
| JP | 08-323867 | 12/1996 |
| JP | 11-228610 | 8/1999 |
| JP | 11-240939 | 9/1999 |
| JP | 11-310626 | 11/1999 |
| JP | 2003-73457 | 3/2003 |
| JP | 2003-192887 | 7/2003 |
| JP | 2005-029579 | 2/2005 |
| WO | 2005/021661 A1 | 3/2005 |
| WO | 2005/092881 A1 | 10/2005 |

* cited by examiner

*Primary Examiner* — Satya Sastri
(74) *Attorney, Agent, or Firm* — Nixon & Vanderhye PC

(57) ABSTRACT

The present invention aims to provide a radiation-curing liquid resin composition for optical tridimensional modeling having good storage stability. The suitable radiation-curing liquid resin composition for optical tridimensional modeling of the present invention includes a compound represented by the below general formula (1), a compound having phenolic hydroxyl group, a cationic polymerizable compound, a radical polymerization initiator, a radical polymerizable compound, one or more sulfur compound selected from the group consisting of 2-mercaptobenzothiazole, 2-(4-morpholinodithiobenzothiazole, diisopropylxantogendisulfide and diphenyldisulfide, a polyether polyol compound.

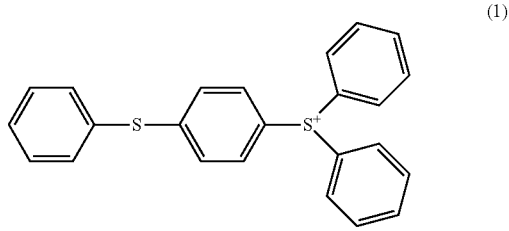

(1)

11 Claims, No Drawings

RADIOACTIVE RAY-CURABLE LIQUID RESIN COMPOSITION FOR USE IN OPTICAL STEREOLITHOGRAPHY, AND OPTICALLY SHAPED ARTICLE PRODUCED BY CURING THE COMPOSITION

CROSS REFERENCE TO RELATED APPLICATION

This application is a Continuation of U.S. Ser. No. 11/917,632 filed Mar. 12, 2009, which is the U.S. national phase of International Application No. PCT/JP2006/312147 filed, Jun. 16, 2006 which designated the U.S. and claims priority to Japanese Application No. 2005-176236, filed Jun. 16, 2005, Japanese Application No. 2005-176080, filed Jun. 16, 2005, Japanese Application No. 2005-306855, filed Oct. 21, 2005 and Japanese Application No. 2005-368066, filed Dec. 21, 2005, the entire contents of each of which are hereby incorporated by reference.

TECHNICAL FIELD

The present invention relates to a radiation-curing liquid resin composition for optical tridimensional modeling and an optically modeled article obtained by curing the composition.

BACKGROUND ART

There is a known optical tridimensional modeling method to form a tridimensional object having a structure of an integrally laminated cured resin layer, being formed by repeating the step of forming the cured resin layer through the selective irradiation of light to a radiation-curing liquid substance (a liquid resin composition) (refer to Patent Documents 1 to 4). A typical example of this optical tridimensional modeling method is explained as follows.

First, a cured resin layer having a specified pattern is formed by selectively irradiating light such as ultraviolet laser to the liquid surface of a radiation-curing liquid resin composition held in a container. Then, by supplying a radiation-curing liquid resin composition in a quantity of a single layer thereof onto the cured resin layer and selectively irradiating light onto the liquid surface, a new cured resin layer is formed integrally onto the previously formed cured resin layer in a continuous fashion with each other. And, by repeating the above steps for the prescribed number of cycles with or without changing the light-irradiation pattern, an integrally laminated tridimensional object by a plurality of cured resin layers is formed.

According to this optical tridimensional modeling method, the target tridimensional object can be provided easily in a short time no matter how complicated its shape is. Such technology is extremely useful at the experimental stage in developing new products in the automobile industry and the consumer-electronics industry, and is becoming an essential means for shortening the development period and for reducing costs.

Conventionally, as radiation-curing liquid resin compositions used in the optical tridimensional modeling method, the resin compositions represented by [1] to [3] as described below have been introduced:

[1] a resin composition containing radical polymerizable organic compounds such as urethane(meth)acrylate, oligoester(meth)acrylate, epoxy(meth)acrylate, thiol, en compound, and photosensitive polyimide (refer to Patent Documents 5 to 7);

[2] a resin composition containing cationic polymerizable organic compounds such as epoxy compound, cyclic ether compound, cyclic lactone compound, cyclic acetal compound, cyclic thioether compound, spiro-ortho-ester compound, and vinylether compound (refer to Patent Documents 8); and

[3] a resin composition containing radical polymerizable organic compounds and cationic polymerizable organic compounds (refer to Patent Documents 9 to 14).

In Patent Documents 15 and 16, there are described antioxidants as components, which can be added to a radiation-curing liquid resin composition used for optical tridimensional modeling.

In the compositions of the above-mentioned [2] and [3], a cationic polymerization initiator of triaryl sulfonium salt type is generally used.

[Chemical 1]

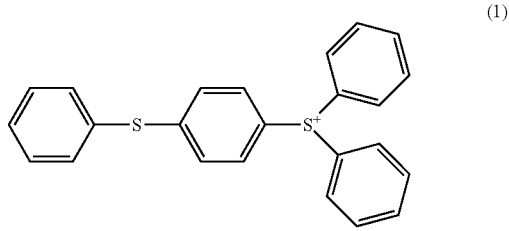

(1)

Commercially available products of this compound comprise UVI-6974, UVI-6976 (manufactured by D.A. W. CHEMICAL CO., INC.), CPI-6976 (manufactured by Aceto Corporation), and the like.

Patent Document 1: JP-A-60-247515
Patent Document 2: JP-A-62-35966
Patent Document 3: JP-A-62-101408
Patent Document 4: JP-A-5-24119
Patent Document 5: JP-A-1-204915
Patent Document 6: JP-A-2-208305
Patent Document 7: JP-A-3-160013
Patent Document 8: JP-A-1-213304
Patent Document 9: JP-A-2-28261
Patent Document 10: JP-A-2-75618
Patent Document 11: JP-A-6-228413
Patent Document 12: JP-A-11-310626
Patent Document 13 : JP-A-11-228610
Patent Document 14: JP-A-11-240939
Patent Document 15: JP-A-8-256062
Patent Document 16: JP-A-2003-240939

DISCLOSURE OF THE INVENTION

Problem to be Solved by the Invention

Tridimensional objects obtained through those tridimensional modeling methods using the above-mentioned radiation-curing liquid resin composition have been widely used in the past as the shape-confirmation models for investigating the design. It is required that such a radiation-curing liquid resin composition has superior storage stability. A composition having inferior storage stability tends to be inferior in its handling because possible storage duration from the formulation to the fabrication of a tridimensional object is short. However, the above-mentioned traditional compositions still leave room for improvement in view of the storage stability.

An object of the present invention is to provide a radiation-curing liquid resin composition for optical tridimensional modeling, which has good storage stability.

Means to Solve the Problem

As the result of wholehearted study and research to achieve the above-mentioned object, the inventors found that the compound represented by the aforementioned formula (1) could exhibit especially superior storage stability when included in a radiation-curing liquid resin composition for optical tridimensional modeling, having a specific component composition and achieved the present invention.

The first radiation-curing liquid resin composition for optical tridimensional modeling according to the present invention (referred to as "liquid resin composition" hereinafter) is characterized in that the composition includes:
a compound represented by the general formula (1) described below;

[Chemical 2]

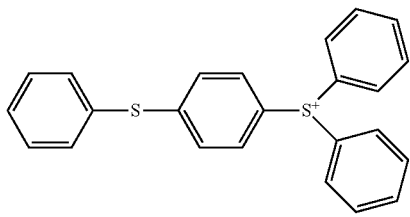

(1)

a compound having phenolic hydroxyl group;
a cationic polymerizable compound;
a radical polymerization initiator;
a radical polymerizable compound;
one or more sulfur compound selected from the group consisting of 2-mercaptobenzothiazole, 2-(4-morpholinodithio)benzothiazole, diisopropylxantogendisulfide and diphenyldisulfide; and
a polyether polyol compound.

This liquid resin composition of the present invention includes the compound having phenolic hydroxyl group, which functions as primary antioxidant, and the sulfur compound, which functions as secondary antioxidant, in addition to the cationic polymerization initiator having a structure of the aforementioned formula (1). Therefore, the liquid resin composition is superior in storage stability.

Further, in recent years, there has been a demand for transparent objects such as optical parts, as the tridimensional objects obtained through the tridimensional modeling methods. It is required that the transparent objects should not turn yellow over time even in high temperature environments. In this point, tridimensional modeled articles, which are less turned to yellow even under a high temperature environment, can be obtained with a high degree of accuracy, because the above liquid resin composition of the present invention includes each of the above components in combination.

In the above-mentioned liquid resin composition of the present invention, it is preferred that, per total content of the composition,
the content rate of the compound represented by the formula (1) is 0.1 to 10% by weight,
the content rate of the compound having phenolic hydroxyl group is 0.1 to 10% by weight,
the content rate of the cationic polymerizable compound is 15 to 85% by weight,
the content rate of the radical polymerization initiator is 0.01 to 10% by weight,
the content rate of the radical polymerizable compound is 0.1 to 25% by weight,
the content rate of the sulfur compound is 0.2 to 3% by weight, and
the content rate of the polyether polyol compound is 1 to 35% by weight.

Then, the second liquid resin composition of the present invention is characterized in that the composition includes:
a compound represented by the general formula (1) described below;

[Chemical 3]

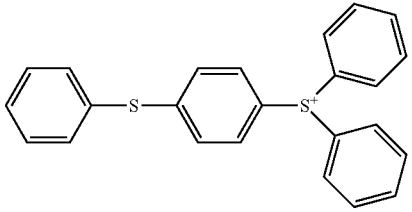

(1)

a compound having phenolic hydroxyl group and/or phosphorous ester group;
a cationic polymerizable compound;
a radical polymerization initiator;
a radical polymerizable compound; and
water;
the content rate of the compound represented by the following formula (2) is 5% or less by weight per weight of the compound represented by the aforementioned formula (1).

[Chemical 4]

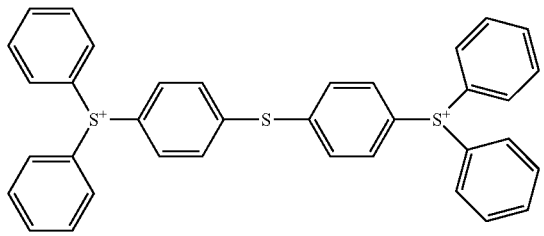

(2)

Such a configured liquid resin composition can exhibit superior storage stability, because the cationic polymerization initiator having a structure of the aforementioned formula (1) is included in combination with the other specific respective components as described above.

Most of commercially available cationic polymerization initiators having a structure of the aforementioned formula (1) generally include a compound having a structure represented by the aforementioned formula (2) at over a certain content rate. It was found, however, that such a compound of the formula (2) lowered storage stability of the liquid resin composition. Contrary thereto, even the liquid resin composition of the present invention can exhibit superior storage stability, because the content of the compound of the aforementioned formula (2) is decreased.

Further, in recent years, concerning the models and the like for transparent objects such as optical parts, there has been a demand for high transparency in addition to high tridimensional modeling accuracy. In this relation, the liquid resin composition of the present invention includes a specific antioxidant, which is a compound having phenolic hydroxyl group and/or phosphorous ester group. Therefore, if optically modeled articles are made from such a liquid resin composition, optically modeled articles obtained can maintain superior transparency for a long time.

In the above liquid resin composition of the present invention, it is characterized that, the content rate of the compound represented by the formula (1) per total content of the composition is 0.1 to 10% by weight,
the content rate of the compound having phenolic hydroxyl group and/or phosphorous ester group is 0.1 to 10% by weight,
the content rate of the cationic polymerizable compound is 15 to 85% by weight,
the content rate of the radical polymerization initiator is 0.01 to 10% by weight,
the content rate of the radical polymerizable compound is 0.1 to 25% by weight, and
the content rate of the water is 0.1 to 2% by weight.

Further, the third liquid resin composition of the present invention is characterized in that the composition includes: a compound represented by the general formula (3) described below;

[Chemical 5]

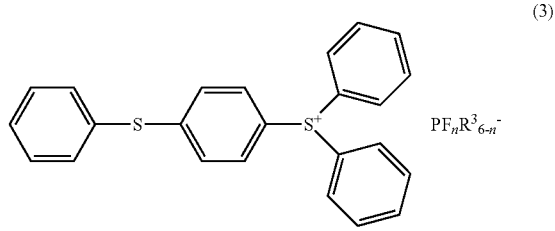

(3)

wherein $R^3$, if plural, is a monovalent organic group independently and at least one thereof is a monovalent aromatic group and n is an integer of 1 to 5;
a compound having phenolic hydroxyl group and/or phosphorous ester group;
a cationic polymerizable compound;
a radical polymerization initiator;
a radical polymerizable compound; and
a polyether polyol compound.

The above liquid resin composition of the present invention has superior storage stability, because the cationic polymerization initiator of triaryl sulfonium salt type represented by the aforementioned formula (3) is included in a specific composition.

In recent years, concerning tridimensional objects obtained through the tridimensional modeling methods, there has been a demand for high tridimensional modeling accuracy and, in particular, for the improvement of the surface smoothness caused by the side-face step between the respective lamination layers on the modeled article.

The composition of [1] in the above prior art is, however, very difficult to attain high modeling accuracy owing to the large curing shrinkage. Although the composition of [2] provides high modeling accuracy in some degree, it tends to provide a brittle cured article of low resistance. Furthermore, the composition of [2] is inferior in initial strength (green strength) after photo-curing and in curing rate to the composition of [1], thus being difficult to attain high modeling rate. The composition of [3] achieves high modeling accuracy and excellent mechanical characteristics compensating the drawbacks of above two methods. Compared with general-use resins, however, the composition of [3] is inferior in a part of mechanical and thermal characteristics. In particular, concerning resistance to fracture the composition of [3] is inferior to the general-use resins. Thus, it tends to be difficult to sufficiently satisfy both of modeling accuracy and other important characteristics in a conventional radiation-curing liquid resin composition.

The improvement in the tridimensional modeling accuracy needs to decrease the dimensional deformation after the photo-curing. Accordingly, increase in initial strength (green strength) after photo-curing needs to increase the radiation-curing property. Nevertheless, a radiation-curing liquid resin composition having high photo-curing rate almost completes the curing reaction within a short time after an irradiation of light, or has a small contribution of the delayed curing reaction so that a step on the side face between the respective laminated layers often appears. As a result, sufficient smoothness is difficult to attain on the surface of the optically modeled article, in particular on the side face thereof.

Contrary thereto, the third liquid resin composition of the above present invention, as described above, is difficult to attain a step on the side face between the respective laminated layers while having high photo-curing property, because the cationic polymerization initiator of triaryl sulfonate type represented by the aforementioned formula (3) is included in a specific composition. Therefore, optically modeled article obtained by using such a liquid resin composition is remarkably superior in surface smoothness.

In the third liquid resin composition, it is preferred that the content of the compound represented by the following formula (4) is not more than 1/20 (weight ratio) of the content of the compound represented by the aforementioned formula (3). The compound of the following formula (4) decreased storage stability of the composition similarly to the compound of the aforementioned formula (2). Therefore, decrease in the content of the compound of the following formula (4) as described above makes storage stability of the liquid resin composition more improved,

[Chemical 6]

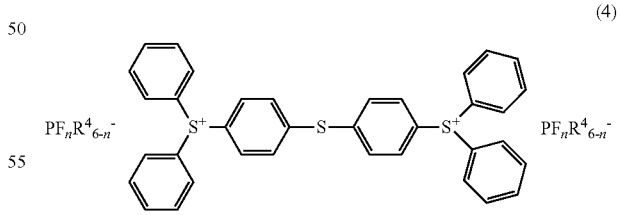

(4)

wherein $R^4$ is a monovalent organic group independently and at least one thereof is a monovalent aromatic group, and n is an integer of 1 to 5.

In the third liquid resin composition of the present invention, it is preferred that, per total content of the composition, the content of the compound represented by the formula (3) is 0.1 to 10% by weight,
the content of the compound having phenolic hydroxyl group and/or phosphorous ester group is 0.1 to 10% by weight, the content of the cationic polymerizable compound is 15 to 85% by weight,
the content of the radical polymerization initiator is 0.01 to 10% by weight,
the content of the radical polymerizable compound is 0.1 to 25% by weight, and
the content of the polyether polyol compound is 1 to 35% by weight.

Further, it is more preferred that the third liquid resin composition includes additionally elastomer particles having a number average particle size of 10 to 1000 nm, which is measured by an electronically microscope method, at 1 to 35% by weight per total content of the composition. With the arrangement inclusion, impact strength and breaking toughness of a cured article of the liquid resin composition.

In the first, second and third liquid resin compositions mentioned above, it is preferred that the above compound having phenolic hydroxyl group is at least one compound selected from the group consisting of the compounds represented by the below (5) to (7):

[Chemical 7]

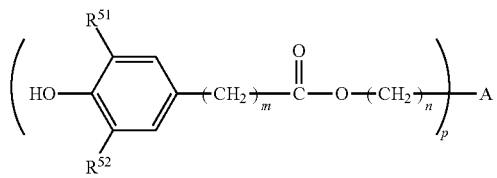

(5)

wherein $R^{51}$ and $R^{52}$ are independently an alkyl group having a carbon number of 1 to 4, which may be branched, m and n are independently 1 or 2, is an integer of 1 to 5, p is 1 to 4, A is an organic group;

[Chemical 8]

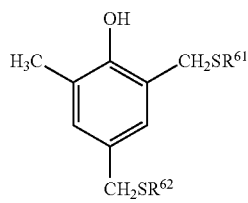

(6)

wherein $R^{61}$ and $R^{62}$ are independently an alkyl group having a carbon number of 6 to 10, which may be branched;

[Chemical 9]

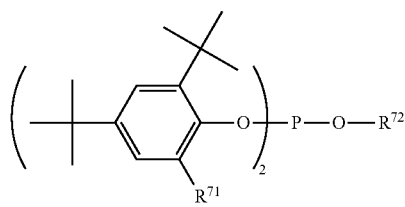

(7)

wherein $R^{71}$ is hydrogen atom, methyl group or single bond combining two aromatic rings, and $R^{72}$ is an organic group.

Of these, it is suitable that the compound having phenolic hydroxyl group is pentaerythrityl-tetrakis [3-(3,5-di-tert-butyl-4-hydroxyphenyl)propionate].

In the first, second and third liquid resin compositions, the above cationic polymerizable compound includes a compound having two or more alicyclic epoxy groups in a single molecule at 40% or more by weight per total content of the cationic polymerizable compound.

Further, the present invention provides modeled articles obtained by irradiating light to the first, second and third liquid resin compositions mentioned above. These optically modeled articles have characteristics, according to the liquid resin composition, which is a raw material, such that they turn less yellow even under high temperature environment, superior transparency is maintained for a long time, and surface smoothness is superior.

Effect of the Invention

The liquid resin composition of the present invention can provides a high-precision, optically modeled article, which has excellent characteristics in that they turn less yellow in high temperature environments, good transparency is maintained for a long time, and surface smoothness is good.

BEST MODES FOR CARRYING OUT THE INVENTION

Hereinafter, best modes for carrying out the invention are explained.

[First Liquid Resin Composition]

First, preferred embodiment of the first liquid resin composition according to the present invention is explained.

The first liquid resin composition includes at least (A1) a compound represented by the general formula (1) described below, (B1) a compound having phenolic hydroxyl group, (C1) a cationic polymerizable compound, (D1) a radical polymerization initiator, (E1) a radical polymerizable compound, (F1) one or more sulfur compound selected from the group consisting of 2-mercaptobenzothiazole, 2-(4-morpholinodithio)benzothiazole, diisopropylxantogendisulfide and diphenyldisulfide, and (G1) a polyether polyol compound. The components (A1) to (G1) and other optional components, which may be blended if necessary, are explained below.

(The (A1) Component)

The (A1) component included in the first liquid resin composition is a compound represented by the following formula (1) and functions as a photo-cationic polymerization initiator for the below-described (C1) component (cationic polymerizable compound). Usually, the compound having a structure represented by the formula (1) can be used in the form of salt as diphenyl(phenylthiophenyl)sulfonium hexafluoroantimonate represented by the following formula (1a).

[Chemical 10]

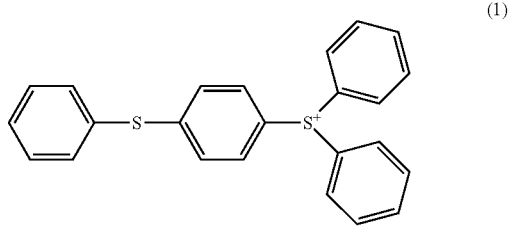

(1)

[Chemical 11]

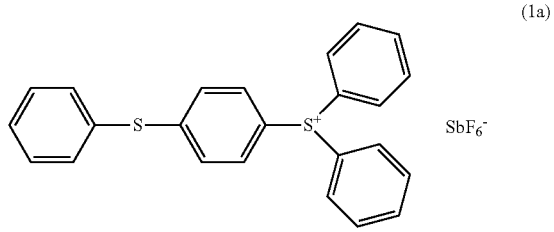

(1a)

In a commercially available compound represented by the aforementioned formula (1), a compound represented by the following formula (2) is usually included as an impurity.

The content of the compound represented by the following formula (2) in the first liquid resin composition is preferably less than 1/20 by weight ratio per the content of the compound represented by the aforementioned formula (1). Thus, storage stability of the liquid resin composition is further improved and increase in viscosity over time is inhibited.

The compound represented by the following formula (2) is mostly in the form of salt as bis[4-(diphenylsulfonio)phenyl]sulfidebishexafluoroantimonate.

[Chemical 12]

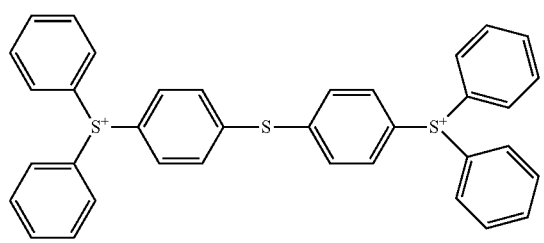

(2)

[Chemical 13]

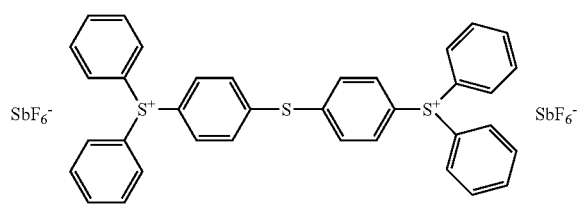

(2a)

As the commercially available (A1) component to be used preferably, in which the content of the compound having a structure represented by the aforementioned formula (2) is enough small within the above range, there are CPI-110, CPI-101A, CPI-110A (manufactured by SAN-APRO LIMITED), for example.

The content of the (A1) component in the first liquid resin composition is, per total content of the composition, preferably 0.1 to 10% by weight, more preferably 0.2 to 8% by weight, further preferably 1 to 8% by weight. If the content of the (A1) component is less than 0.1% by weight, radiation-curing property of the liquid resin composition tends to decrease and a tridimensional having sufficient mechanical strength cannot be modeled. On the other hands, if the content of the (A1) component is over 10% by weight and when the liquid resin composition is subjected to an optical tridimensional modeling method, it tends to be difficult to attain suitable optical transparency and to control curing depth, and thus modeling accuracy of a tridimensional object to be obtained tends to decrease.

(The (B1) Component)

The (B1) component included in the first liquid resin composition is a compound having phenolic hydroxide group. Applicable (B1) component includes a known antioxidant. Preferred one is hindered phenol-based compound in the first liquid resin composition. Through the addition of the (B1) component in combination with the after-mentioned (F1) component, a tridimensional modeled article, which turns less yellow even in high temperature environments, can be obtained with a high degree of accuracy.

Specific examples of the (B1) component comprise the following compounds. It is noted that the name described in parenthesis after the compound name is an example for a trade name. The hindered phenolic compound includes, pentaerythrityl-tetrakis[3-(3,5-di-tert-butyl-4-hydroxyphenyl)propionate] (Irganox 1010), thiodi ethylene-bis[3-(3,5-di-tert-butyl-4-hydroxyphenyl)propionate] (Irganox 1035FF), 3,5-bis(1,1-dimethylethyl)-4-hydroxy-benzene propanate, ethyl enebis(oxyethylene)bis [3-(5-tertert-butyl-4-hydroxy-m-tolyl)propionate] (Irganox 245), octadecyl-3-(3,5-tert-butyl-4-hydroxyphenyl)propionate (Irganox 1076), 3,3',3",5,5', 5"-hexa-tert-butyl-a,a',a"-(mesitylene-2,4,6-triyl)tri-p-cresol (Irganox 1330), 1,3,5-tris(3,5-di-tert-butyl-4-hydroxybenzyl)-1,3,5-triazine-2,4,6(1H,3H, 5H)-trione (Irganox 3114), 4,6-bis(octylthiomethyl)-o-cresol (Irganox 1520L), 9-bis[2-{3-(3-tertert-butyl-4-hydroxy-5-methylphenyl)propionyloxy}-1,1-di met-hylethyl]-2,4,8,10-tetraoxaspiro [5,5]undecane (Sumilizer GA-80), and 2,6-tert-butyl-4-methylphenol (Sumilizer BHT): (Irganox is a trade mark of Ciba Specialty Chemicals K.K., and Sumilizer is a trade mark of Sumitomo Chemical Co., Ltd.).

Of these, it is preferred to use pentaerythrityl-tetrakis[3-(3, 5-di-tert-butyl -4-hydroxyphenyl)propionate] because its inhibiting effect to prevent a tridimensional modeled article from turning yellow over time in high temperature environments is high.

Examples of the commercially available hindered phenol-based (B1) component comprise Irganox 1010, 1035FF, 245, 1076, 1330, 3114, 1520L, and 3125 (manufactured by Ciba Specialty Chemicals K.K.), Sumilizer BHT, and GA-80, (manufactured by Sumitomo Chemical Co., Ltd.), and Cyanox 1790 (manufactured by Cytec Co., Ltd.).

The content of the (B1) component in the first liquid resin composition is, per total content of the composition, preferably 0.1 to 10% by weight, more preferably 0.1 to 5% by weight, further preferably 1.0 to 5.0% by weight. If the content of the (B1) component is less than 0.1% by weight or more than 10% by weight, there may be defect in that inhibiting effect to prevent a tridimensional modeled article from turning yellow over time in high temperature environments becomes insufficient, for example.

(The (C1) Component)

The (C1) component included in the first liquid resin composition is a cationic polymerizable compound. This (C1) component is a compound that initiates polymerization reaction and cross-linking reaction under light irradiation in the presence of a cationic photo-polymerization initiator.

Although the (C1) component is not specifically limited, a preferable one is a compound having two or more alicyclic epoxy groups in a single molecule. With the presence of over 40% by weight of the compound having two or more alicyclic epoxy groups in a single molecule per total content (100%) of the (C1) component, good curing rate, mechanical strength and heat resistance can be attained.

Examples of the (C1) component comprise: bisphenol A diglycidyl ether, bisphenol F diglycidyl ether, bisphenol S diglycidyl ether, brominated bisphenol A diglycidyl ether, brominated bisphenol F diglycidyl ether, brominated bisphenol S diglycidyl ether, epoxy novolak resin, hydrogenated bisphenol A diglycidyl ether, hydrogenated bisphenol F diglycidyl ether, hydrogenated bisphenol S diglycidyl ether, 3,4-epoxy cyclohexyl methyl-3',4'-epoxycyclohexylcarboxylate, 2-(3,4-epoxycyclohexyl -5,5-spiro-3,4-epoxy)cyclohexane-metha-dioxane, bis(3,4-epoxycyclohexylmethyeadipate, bis(3,4-epoxy-6-methylcyclohexylmethyl)adipate, 3,4-epoxy-6-methylcyclohexyl-3',4'-epoxy -6'-methylcyclohexane carboxylate, □-caprolactone modified 3,4-epoxycyclohexylmethyl-3',4'-epoxycyclohexane carboxylate, trimethylcaprolactone modified 3,4-epoxycylohexylmethyl-3',4'-epoxycyclohexane carboxylate, β-methyl-δ-valerolactone modified 3,4-epoxycyclohexylmethyl-3',4'-epoxycyclohexane carboxylate, methylenebis(3,4-epoxycyclohexane), di(3,4-epoxycyclohexylmethyl)ether of ethyleneglycol, ethylenebis(3,4-epoxycyclohexane carboxylate), epoxycyclohexadioctyl hydrophthalate, epoxycyclohexa-di-2-ethylhexyl hydrophthalate, 1,4-butanediol diglycidylether, 1,6-hexanediol diglycidylether, neopentylglycol diglycidylether, trimethylolpropane triglycidylether, polyethyleneglycol digrycidylether, glycerin triglycidylether, and polypropyleneglycol diglycidylether; polyglycidylether of polyether polyol prepared by adding one or more alkylene oxide to aliphatic polyhydric alcohol such as ethyleneglycol, propyleneglycol, and glycerin; diglycidylester of long chain aliphatic dibasic acid; monoglycidylether of higher aliphatic alcohol; monoglycidylether of polyether alcohol prepared by adding phenol, cresol, butylphenol, or alkyleneoxide; grycidylester of higher fatty acid; epoxylated soybean oil; epoxybutylstearate; epoxyoctylstearate; epoxylated linseed oil; and oxetane compounds such as epoxylated polybutadiene and 1,4-bis[(3-ethyl-3-oxetanylmethoxy)methyl]benzene. The above cationic polymerizable compounds can comprise the (C1) component independently or in combination of two or more of them.

Of these cationic polymerizable compounds, preferred ones are 3,4-epoxycyclohexylmethyl-3',4'-epoxycyclohexyl carboxylate, bis(3,4-epoxycyclohexylmethyl)adipate, ϵ-caprolactone modified 3,4-epoxycyclohexylmethyl -3',4'-epoxycyclohexyl carboxylate, trimethylcaprolactone modified 3,4-epoxycyclohexylmethyl-3',4'-epoxycyclohexane carboxylate, β-methyl-δ-valerolactone modified 3,4-epoxycyclohexylmethyl-3',4'-epoxycyclohexane carboxylate, bisphenol A diglycidyl ether, bisphenol F diglycidyl ether, hydrogenated bisphenol A diglycidyl ether, hydrogenated bisphenol F diglycidyl ether, 1,4-butanediol diglycidylether, 1,6-hexanediol diglycidyl ether, trimethylolpropane triglycidylether, glycerin triglycidylether, polyethyleneglycol digrycidylether, polypropyleneglycol diglycidylether, and 1,4-bis[(3-ethyl-3-oxetanylmethoxy)methyl]benzene.

In view of attaining good curing rate, mechanical strength and heat resistance as described above, more preferred ones are compounds having two or more alicyclic epoxy groups in a single molecule, such as 3,4-epoxycyclohexylmethyl-3',4'-epoxycylcohexyl carboxylate and bis(3,4-epoxycyclohexylmethyl)adipate.

Examples of commercially available (C1) can comprise UVR-6100, UVR-6105, UVR-6110, UVR-6128, UVR-6200, and UVR-6216, (manufactured by Union Carbide Corporation), CELOXIDE 2021, CELOXIDE 2021P, CELOXIDE 2081, CELOXIDE 2083, CELOXIDE 2085, Epolead GT-300, Epolead GT-301, Epolead GT-302, Epolead GT-400, Epolead 401, and Epolead 403, (manufactured by DAICEL CHEMICAL INDUSTRIES, LTD.), KRM-2100, KRM-2110, KRM-2199, KRM-2400, KRM-2410, KRM-2408, KRM-2490, KRM-2200, KRM-2720, and KRM-2750, (manufactured by ADECA Corporation), Rapi-cure DVE-3, CHVE, PEPC, (manufactured by ISP Co., Ltd.), Epicoat 828, Epicoat 812, Epicoat 1031, Epicoat 872, and Epicoat CT508, (manufactured by Japan Epoxy Resin Co., Ltd.), XDO (manufactured by TOA GOSEI CO., TTD.), and VECOMER 2010, 2020, 4010, and 4020, (manufactured by Allied Signal, Inc.).

The content of the (C1) component in the first liquid resin composition is, per total content of the composition, preferably 15 to 85% by weight, more preferably 30 to 80% by weight, further preferably 40 to 75% by weight. If the content of the (C1) component is over 85% by weight, deformation such as warp of a tridimensional modeled article tends to become greater. On the other hands, if the content of the (C1) component is less than 15% by weight, mechanical strength and thermal characteristics tend to be lowered.

(The (D1) Component)

The (D1) component included in the first liquid resin composition is a radical polymerization initiator. This (D1) component is a compound which decomposes under radiation rays such as light and the like to generate radicals, which then initiate the radical polymerization of the after-mentioned (E1) component (radical polymerizable compound).

Examples of the (D1) component comprise, acetophenone, acetophenonebenzylketal, anthraquinone, 1-(4-isopropylphenyl)-2-hydroxy -2-methylpropane-1-one, carbazole, xanthone, 4-chlorobenzophenone, 4,4'-diaminobenzophenone, 1,1-dimethoxydeoxybenzoin, 3,3'-dimethyl-4-methoxybenzophenone, thioxanthone-based compound, 2-methyl-1-[4-(methylthio)phenyl]-2-morphorino-propane -2-one, 2-benzyl-2-dimethylamino-1-(4-morphorinophenyl)-butane -1-one, triphenylamine, 2,4,6-trimethylbenzoyl-diphenylphosphine oxide, bis(2,6-dimethoxybenzoyl)-2,4,4tri-methylpentylphosphine oxide, benzyldimethylketal, 1-hydroxycyclohexylphenylketone, 2-hydroxy-2-methyl-1-phenylpropane-1-one, fluorenone, fluorene, benzaldehyde, benzoin methyl ether, benzoin propyl ether, benzophenone, Michler's ketone, 3-methylacetophenone, 3,3',4,4'-tetra(tert-butylperoxycarbonyl)benzophenone (BTTB), and a combination of BTTB with dye sensitizer such as xanthene, thioxanthene, cournalin, and ketocoumalin.

Of these, specifically preferred ones are benzyldimethylketal, 1-hydroxycyclohexylphenylketone, 2,4,6-trimethylbenzoyldiphenylphosphine oxide, and 2-benzyl-2-dimethylamino-1-(4-morphorinophenyl)-butane-1-one. These above radical polymerization initiators can structure the (D1) component independently or in combination with two or more of them.

The content of the (D1) component in the first liquid resin composition is, per total content of the composition, preferably 0.01 to 10% by weight, more preferably 0.1 to 5% by weight. If the content of the (D1) component is less than 0.01% by weight, radical polymerization reaction rate (curing rate) of a liquid resin composition tends to decrease so that modeling tends to require longer time and resolution tend to decrease. On the other hands, if the content of the (D1) component is over 10% by weight, excess content of the polymerization initiator may decrease curing characteristics of the liquid resin composition and have adverse effects on humidity resistance and heat resistance of a tridimensional modeled article.

(The (E1) Component)

The (E1) component included in the first liquid resin composition is a radical polymerizable compound. Specifically, the compound is a compound having ethylenic unsaturated bond (C=C), and examples of that kind of compound are a monofunctional monomer having one ethylenic unsaturated bond in a single molecule, and a polyfunctional monomer having two or more ethylenic unsaturated bonds in a single molecule.

The monofunctional and the polyfunctional monomers can comprise the (E1) component independently or in combination of two or more of them, or in combination of at least one monofunctional monomer with at least one polyfunctional monomer.

It is preferable that the (E1) component contains 60% by weight or more of tri- or higher functional monomer, i.e. a polyfunctional monomer having three or more of ethylenic unsaturated bonds in a single molecule, per total content (100% by weight) of the (E1) component. More preferable content of the tri- or higher functional monomer is 70% by weight or more, further more preferable content is 80% by weight or more, and most preferable content is 100% by weight. If the content is 60% by weight or more, the radiation-curing property of the obtained resin composition further improves, and the deformation over time of a tridimensional modeled article tends not to occur.

Examples of the monofunctional monomer of the (E1) component can comprise compounds such as acrylamide, (meth)acryloyl morpholine, 7-amino-3,7-dimethyloctyl (meth)acrylate, isobutoxymethyl(meth)acrylamide, isobornyloxyethyl(meth)acrylate, isobornyl(meth)acrylate, 2-ethylhexyl(meth)acrylate, ethyldiethyleneglycol(meth)acrylate, t-octyl(meth)acrylamide, diacetone(meth)acrylamide, dimethylaminoethyl(meth)acrylate, diethylaminoethyl(meth)acrylate, lauryl(meth)acrylate, dicyclopentadiene(meth)acrylate, dicyclopentenyloxyethyl(meth)acrylate, dicyclopentenyl(meth)acrylate, N,N-dimethyl(meth)acrylamidetetrachlorophenyl(meth)acrylate, 2-tetrachlorophenoxyethyl(meth)acrylate, tetrahydrofulfuryl(meth)acrylate, tetrabromophenyl(meth)acrylate, 2-tetrabromophenoxyethyl(meth)acrylate, 2-trichlorophenoxyethyl(meth)acrylate, tribromophenyl(meth)acrylate, 2-tribromophenoxyethyl(meth)acrylate, 2-hydroxyethyl(meth)acrylate, 2-hydroxypropyl(meth)acrylate, vinylcaprolactam, N-vinylpyrrolidone, phenoxyethyl(meth)acrylate, butoxyethyl(rneth)acrylate, pentachlorophenyl(meth)acrylate, pentabromophenyl(meth)acrylate, polyethyleneglycolmono(meth)acrylate, polypropyleneglycolmono(meth)acrylate, bornyl(meth)acrylate, and methyltriethylenediglycol(meth)acrylate.

Examples of the polyfunctional monomer of the (E1) component can comprise ethyleneglycoldi(meth)acrylate, dicyclopentenyldi(meth)acrylate, triethyleneglycoldiacrylate, tetraethyleneglycoldi(meth)acrylate, tricyclodecanediyldimethylenedi(meth)acrylate, tris(2-hydroxyethyl)isocyanuratedi(meth)acrylate, tris(2-hydroxyethyl)isocyanuratetri(meth)acrylate, caprolactone modified tris(2-hydroxyethyl)isocyanuratetri(meth)acrylate, trimethylolpropanetri(meth)acrylate, ethylene oxide, (hereinafter referred to as "EO"), modified trimethylolpropanetri(meth)acrylate, propylene oxide, (hereinafter referred to as "PO"), modified trimethylolpropanetri(meth)acrylate, tripropyleneglycoldi(meth)acrylate, neopentylglycoldi(meth)acrylate, (meth)acrylic acid additive on both terminals of bisphenol A diglycidylether, 1,4-butanedioldi(meth)acrylate, 1,6-hexanedioldi(meth)acrylate, pentaerythritoltri(meth)acrylate, pentaerithritoltetra(meth)acrylate, polyesterdi(meth)acrylate, polyethyleneglycoldi(meth)acrylate, dipentaerithritolhexa(meth)acrylate, dipentaerithritolpenta(meth)acrylate, dipentaerithritoltetra(meth)acrylate, caprolactone modified dipentaerithritolhexa(meth)acrylate, caprolactone modified dipentaerithritolpenta(meth)acrylate, ditrimethylolpropanetetra(meth)acrylate, EO modified bisphenol A di(meth)acrylate, PO modified bisphenol A di(meth)acrylate, EO modified hydrogenated bisphenol A di(meth)acrylate, PO modified hydrogenated bisphenol A di(meth)acrylate, EO modified bisphenol F di(meth)acrylate, and (meth)acrylate of phenol novolak polyglycidylether.

Of these, the (E1) component preferably includes those corresponding to the tri- or higher functional monomer, such as tri(meth)acrylate compound, tetra(meth)acrylate compound, penta(meth)acrylate compound, and hexa(meth)acrylate compound.

More specifically, particularly preferred ones are, trimethylolpropanetri(meth)acrylate, neopentylglycoldi(meth)acrylate, EO modified trimethylolpropanetri(meth)acrylate, dipentaerithritolhexa(meth)acrylate, dipentaerithritolpenta(meth)acrylate, ditrimethylolpropanetetra(meth)acrylate, and dipentaerithritolmonohydroxypenta(meth)acrylate.

Examples of commercially available monofunctional monomer in the (E1) component can comprise Aronix M-101, M-102, M-111, M-113, M-117, M-152, and TO-1210 (manufactured by TOA GOSEI CO., LTD.), KAYARAD TC-110S, R-564, and R-128H (manufactured by NIPPON KAYAKU CO., LTD.), Biscoat 192, Biscoat 220, Biscoat 2311HP, Biscoat 2000, Biscoat 2100, Biscoat 2150, Biscoat 8F, and Biscoat 17F (manufactured by Osaka Organic Chemical Industry Ltd.).

Examples of commercially available polyfunctional monomer in the (E1) component can comprise SA 1002 (manufactured by Mitsubishi Chemical Corporation), Biscoat 195, Biscoat 230, Biscoat 260, Biscoat 215, Biscoat 310, Biscoat 214HP, Biscoat 295, Biscoat 300, Biscoat 360, Biscoat GPT, Biscoat 400, Biscoat 700, Biscoat 540, Biscoat 3000, and Biscoat 3700 (manufactured by Osaka Organic Chemical Industry Ltd.), KARAYAD R-526, HDDA, NPGDA, TPGDA, MANDA, R-551, R-712, R-604, R-684, PET-30, GPO-303, TMPTA, THE-330, DPHA, DPHA-2H, DPHA-2C, DPHA-21, D-310, D-330, DPCA-20, DPCA-30, DPCA-60, DPCA-120, DN-0075, DN-2475, T-1420, T-2020, T-2040, TPA-320, TPA-330, RP-1040, RP-2040, R-011, R-300, and R-205 (manufactured. by NIPPON KAYAKU CO., LTD.), Aronix M-210, M-220, M-233, M-240, M-215, M-305, M-309, M-310, M-315, M-325, M-400, M-6200, and M-6400 (manufactured by TOA GOSEI CO., LTD.), Light Acrylate BP-4EA, BP-4PA, BP-2EA, BP-2PA, and DCP-A (manufactured by KYOEISHA CHEMICAL CO., LTD.), New Frontier BPE-4, BR-42M, and GX-8345 (manufactured by DAI-ICHI KOGYO SEIYAKU Co., LTD.), ASF-400 (manufactured by Nippon Steel Chemical Co, Ltd.), Lipoxy SP-1506, SP-1507, SP-1509, VR-77, SP-4010, and SP-4060 (manufactured by SHOWA HIGHPOLYMER CO., LTD.), and NK Ester A-BPE-4 (manufactured by Shin-Nakamura Chemical Co., Ltd.).

The content of the (El) component in the first liquid resin composition is, per total content of the composition, preferably 0.1 to 25% by weight, more preferably 0.1 to 15% by weight. If the (E1) component is included as above, radiation-curing property of the liquid resin composition tends to improve and deformation over time of the tridimensional modeled article tends not to occur. If the content of the (E1) component is over 25% by weight, impact resistance and resistance to fracture of the tridimensional modeled article tend to decrease.

(The (F1) Component)

The (F1) component included in the first liquid resin composition is one or more sulfur compound selected from the group consisting of 2-mercaptobenzothiazole, 2-(4-morpholinodithiobenzothiazole, diisopropylxantogendisul fide and diphenyldisulfide.

With the inclusion of the (F1) component, change (yellowing) over time of transparency of the cured article (tridimensional modeled article) obtained by irradiation of light to the liquid resin composition, can be sufficiently inhibited even in a high-temperature environment of 80° C. and 2 hours, for example.

Here, 2-(4-morphlinodithio)benzothiazol of the (F1) component is a compound represented by the formula (8). Isopropylxantgendisulfide is a compound represented by the formula (9). Diphenyldisulfide is a compound represented by the formula (10).

[Chemical 14]

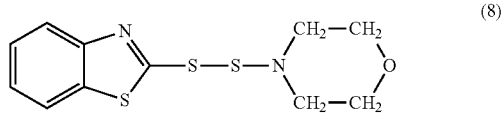
(8)

[Chemical 15]

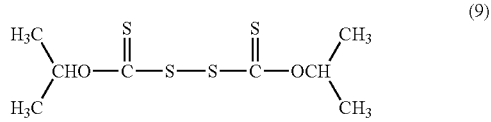
(9)

[Chemical 16]

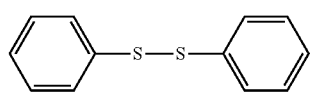
(10)

The content of the (F1) component in the first liquid resin composition is, per total content of the composition, preferably 2 to 3% by weight. It is noted that the especially preferred content of the (F1) component varies within the above range as follows, depending on the kind of the (F1) component. In case of 2-mercaptobenzothiszole, 0.2 to 1.5% by weight is preferable and 0.2 to 0.7% by weight is more preferable. In case of 2-(4-morpholinodithiobenzothiazole or diisopropylxantogendisulfide, 0.2 to 3% by weight is preferable. Further, in case of diphenyldisulfide, 1 to 3% by weight is preferable.

If the content of the (F1) component is less than 0.1% by weight, inhibiting effect to prevent the tridimensional modeled article from turning yellow sometimes cannot be attained sufficiently. On the other hands, if the (F1) component is over 3% by weight, polymerization is inhibited and therefore a liquid resin composition is not sufficiently cured so that elastic modulus of the tridimensional modeled article to be obtained by the tridimensional modeling method tends to decrease.

(The (G1) Component)

The (G1) component included in the first liquid resin composition is polyether polyol. Through the addition of this (G1) component, radiation-curing property of the liquid resin composition is improved, mechanical characteristics, specifically the elastic modulus of the cured product, is improved, and change over time of shape and mechanical characteristics of the tridimensional modeled article obtained by the tridimensional modeling method can be inhibited.

A preferred (G1) component is one having three or more hydroxyl groups in a single molecule, and specifically preferred one has three to six hydroxyl groups in a single molecule. By using a polyether polyol having three or more hydroxyl groups in a single molecule, sufficiently improved effect of radiation-curing property can be attained, and mechanical characteristics, specifically elastic modulus, of the tridimensional modeled article to be obtained can be stabilized.

Examples of the (G1) component can comprise ones prepared by modifying trivalent or more, polyvalent alcohols, such as trimethylolpropane, glycerin, pentaerythritol, sorbitol, sucrose, and quadrol by cyclic ether compounds such as ethylene oxide (EO), propylene oxide (PO), butylene oxide, and tetrahydrofuran.

Specific examples can comprise EO modified trimethylolpropane, PO modified trimethylolpropane, tetrahydrofuran modified trimethylol propane, EO modified glycerin, PO modified glycerin, tetrahydrofuran modified glycerin, BO modified pentaerythritol, PO modified pentaerythritol, tetrahydrofuran modified pentaerythritol, EO modified sorbitol, PO modified sorbitol, EO modified sucrose, PO modified sucrose, and EO modified quodol. The above polyether polyols can structure the (G1) component separately or in combination of two or more of them.

Examples of commercially available (G1) component can comprise Sunnix TP-400, Sunnix GP-600, Sunnix GP-1000, Sunnix SP-750, Sunnix GP-250, Sunnix GP-400, and Sunnix GP-600 (manufactured by Sanyo Chemical Industries, Ltd.), TMP-3Glycol, PNT-4 Glycol, EDA-P-4, and EDA-P-8 (manufactured by Nippon Nyukazai Co., Ltd.), G-300, G-400, G-700, T-400, EDP-450, SP-600, and SC-800 (manufactured by ADECA Corporation), SCP-400, SCP-1000, and SP-1600 (manufactured by Sakamoto Yakuhin Kogyo Co., Ltd.).

The content of the (G1) component in the first liquid resin composition is, per total content of the composition, preferably 1 to 35% by weight, more preferably 1 to 25% by weight, most preferably 3 to 15% by weight.

If the (G1) component is less than 1% by weight, delaying-curing property of the radiation-curing composition deteriorate, improved effect of radiation-curing property cannot be attained sufficiently, and possibly the tridimensional modeled article having good shape-stability and property-stability cannot be obtained.

On the other hand, if the content of the (G1) component is over 35% by weight, radiation-curing property of the liquid resin composition decreases and elastic modulus of the tridimensional modeled article obtained by the optical modeling method tends to decrease.

(Other Components)

The first liquid resin composition preferably includes water as the (H1) component in addition to the above (A1) to (G1) components. With the inclusion of this (H1) component, radiation-curing property of the liquid resin composition can be improved. Further, mechanical characteristics, especially elastic modulus of the cured article obtained by irradiation of light to the liquid resin composition is improved and, thus, change over time of shape and mechanical characteristics of the tridimensional modeled article by the optical modeling method can be inhibited.

The content of the (H1) component in the first liquid resin composition is, per total content of the composition, preferably 0.1 to 2% by weight, more preferably 0.2 to 1% by weight. If the (H1) component is less than 0.1% by weight, sensitivity of the liquid resin composition is likely to change over time and it tends to be difficult to attain stable modeling.

On the other hands, if more than 2% by weight, elastic modulus of the tridimensional modeled article obtained by the optical modeling method tends to decrease.

The first liquid resin composition may further include a component other than the (H1) component to improve physical property and the like of the tridimensional modeled article produced by the composition. The other component, which can be arbitrarily added, may comprise a photo-sensitizer (polymerization accelerator) and reactive diluent, for example.

Examples of the photo-sensitizer comprise: amine-based compound such as triethanolamine, methyldiethanolamine, triethylamine, and diethylamine; thioxanthone; a derivative of thioxanthone; anthraquinone; a derivative of anthraquinone; anthracene; a derivative of anthracene; perylene; a derivative of perylene; benzophenone; and benzoin isopropylether.

Furthermore, the first liquid resin may further include various additives as other arbitrary components within a range not adversely affecting the object and the effect of the present invention. Examples of these other additives can comprise: polymers or oligomers such as epoxy resin, polyamide, polyamideimide, polyurethane, polybutadiene, polychloroprene, polyether, polyester, styrene-butadiene block copolymer, petroleum resin, xylene resin, ketone resin, cellulose resin, fluorine-based oligomer, silicone-based oligomer, and polysulfide-based oligomer; polymerization inhibitors such as phenothyazine and 2,6-di-tert-butyl -4-methylphenol; polymerization initiator assistant; leveling agent; wettability improving agent; surface active agent; plasticizer; ultraviolet light absorber; silane coupling agent; inorganic filler; elastomer particles; pigment; and dye.

(Preparation of the First Liquid Resin Composition)

The liquid resin composition including the above-mentioned respective components can be prepared by charging adequate content of the above respective (A1) to (H1) components, and other additives into an agitation vessel, and by agitating the contents normally at temperatures of 30 to 70° C., preferably 50 to 60° C. for a period of normally 1 to 6 hours, preferably 1 to 2 hours.

[Second Liquid Resin Composition]

Then, preferred embodiment of the second liquid resin composition according to the present invention is explained.

The second liquid resin composition includes at least (A2) a compound represented by the above general formula (1), (B2) a compound having phenolic hydroxyl group and/or phosphorous ester group, (C2) a cationic polymerizable compound, (D2) a radical polymerization initiator, (E2) a radical polymerizable compound, and (F2) water. Components (A2) to (F2) and other optional components, which are blended, if necessary, are explained below.

(The (A2), (C2), (D2), (E2), and (F2) Components)

The (A2) component included in the second liquid resin composition is the same as the (A1) component included in the first liquid resin composition. The second liquid resin composition includes the compound represented by the aforementioned formula (1) and, therefore, has superior storage stability and can be converted into the optically modeled article having superior transparency after curing. Similarly, in such a (A2) component, the compound represented by the aforementioned formula (2), which is an impurity of the compound represented by the aforementioned formula (1), is included in many cases. The content of the compound represented by the formula (2) in the second liquid resin composition is, per the weight of the compound represented by the formula (1), 5% by weight or less (0 to 5% by weight), preferably 0 to 4% by weight, more preferably 0 to 3% by weight. In the case where such a condition is satisfied, storage stability of the liquid resin composition is good and viscosity increase over time tends to be inhibited.

The (C2) component is the same as the (C1) component in the first liquid resin composition. In this (C2) component, it is preferred that 50% by weight and more of the compound having two or more alicyclic epoxy groups in a single molecule is included per total content of the (C2) component. Thus, good curing rate and mechanical strength can be attained.

Further, the (D2), (E2), and (F2) components are the same as the (D1), (E1), and (H1) components in the first liquid resin composition, respectively.

(The (B2) Component)

The (B2) component included in the second liquid resin composition of the present invention is a compound having phenolic hydroxide group and/or phosphorous ester group. As such a (B2) component, there are known antioxidants, and specifically preferred ones are hindered phenol-based compound and phosphorus-based compound. With the inclusion of the (B2) component, coloring (yellowing) over time of the tridimensional modeled article is effectively reduced. As a result, it becomes possible to maintain high transparency of the tridimensional modeled article for a long time after modeling. Examples of the (B2) component can comprise the following compounds. It is noted that the name described in parenthesis after the compound name is an example for a trade name.

First, as the hindered phenolic compound, the same hindered phenolic compounds as that in the above (B1) component can be exemplified.

The phosphorus-based compounds comprise tris(2,4-di-tert-butylphenyl)phosphite (Irgafos 168), bis[2,4-bis(1,1-dimethylethyl)-6-methylphenyl]ethyl ester phosphate (Irgafos 38), and 6-[3-(3-tert-butyl-4-hydroxy-5-methylphenyl)-propoxy]-2,4,8,10-tetr-a-benz[d,f][1,3,2]-dioxaphosphepin (Sumilizer GP): (Irgafos is a trade mark of Ciba Specialty Chemicals K.K., and Sumilizer is a trade mark of Sumitomo Chemical Co. Ltd.).

Examples of the commercially available phosphorus-based compound, which is the (B2) component, comprise Irgafos 168, 12, and 38 (manufactured by Ciba Specialty Chemicals K.K.), ADK, STAB, 329K, PEP36, and PEP-8 (manufactured by ADECA Corporation), Sandstab P-EPQ (manufactured by Clariant Inc.), Weston 618, 619G, and Ultranox 626, (manufactured by General Electric Company), and Sumilizer GP (manufactured by Sumitomo Chemical Co., Ltd.).

Of the above-mentioned (B2) components, preferred ones are pentaerythrityl-tetrakis [3-(3,5-di-tert-butyl-4-hydroxyphenyl)propionate], 3,5-bis(1,1-dimethylethyl)-4-hydroxy-benzene propanate, ethylenebis(oxyethylene)bis[3-(5-tert-butyl-4-hydroxy-m-tolyl)propionate], 4,6-bis(octylthiomethyl)-o-cresol, bis[2,4-bis(1,1-dimethylethyl)-6-methylphenyl]ethyl ester phosphite, and 6-[3-(3-tert-butyl-4-hydroxy-5-methylphenyl)-propoxy]-2,4,8,10-tetra-tert-butyl-benz [d,f][1,3,2]-dioxaphosphepin because transparency of the tridimensional object after modeling can be maintained for a long time. Of these, pentaerythrityl-tetrakis[3-(3,5-di-tert-butyl-4-hydroxyphenyl)propionate] is effective.

Specifically preferred (B2) compound in the second liquid resin composition is one or more compounds selected from the group consisting of compounds represented by the formula (5), the formula (6), and the formula (7) given below:

[Chemical 17]

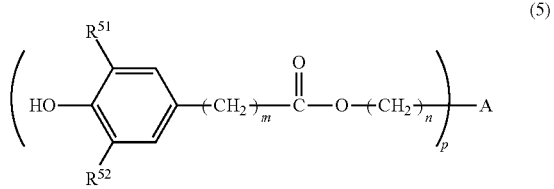

(5)

wherein $R^{51}$ and $R^{52}$ are each independently alkyl group having a carbon number of 1 to 4, which may be branched, m and n are each independently 1 or 2, p is 1 to 4, and A is hydrogen atom or an organic group.

Examples of the A in the formula (5) include a carbon atom, in which p is 4, and a group represented by $—O—(CH_2)_2—O—$, in which p is 2, for example. Examples of commercially available compound having the structure represented by the formula (5) comprise above-mentioned Irganox 1010, 1035, and 245, and Sumilizer GA-80:

[Chemical 18]

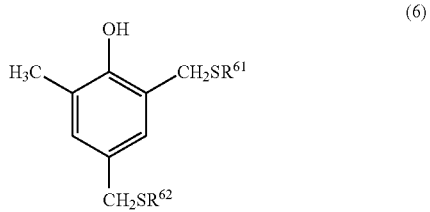

(6)

wherein $R^{61}$ and $R^{62}$ are each independently an alkyl group having a carbon number of 6 to 10, which may be branched.

Commercially available compound represented by the formula (6) is, for example, Irganox 1520L:

[Chemical 19]

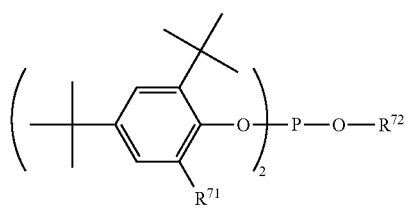

(7)

wherein $R^{71}$ is a hydrogen atom, a methyl group, a single bond combining two aromatic rings, and $R^{72}$ is an organic group.

Examples of commercially available compound represented by the formula (7) are Irganox 38 and Sumilizer GP.

The content of the (132) component in the second liquid resin composition is, per total content of the composition, preferably 0.1 to 10% by weight, more preferably 0.1 to 5% by weight, most preferably 1.0 to 5.0% by weight. If the content of the (B2) component is less than 0.1% by weight or over 10% by weight, it is not preferred because transparency of the optically modeled article decreases over time.

(Other Components)

In the second liquid resin composition, various additives as other arbitrary components can be included within a range not adversely affecting the object and the effect of the present invention. Examples of these other additives can comprise: polymers or oligomers such as epoxy resin, polyamide, polyamideimide, polyurethane, polybutadiene, polychloroprene, polyether, polyester, styrene-butadiene block copolymer, petroleum resin, xylene resin, ketone resin, cellulose resin, fluorine-based oligomer, silicone-based oligomer, and polysulfide-based oligomer; polymerization inhibitors such as phenothyazine and 2,6-di-tert-butyl -4-methylphenol; polymerization initiator assistant; leveling agent; wettability improving agent; surface active agent; plasticizer; ultraviolet light absorber; silane coupling agent; inorganic filler; elastomer particles; pigment; and dye.

(Preparation of the Second Liquid Resin Composition)

The second liquid resin composition can be prepared by charging adequate content of the above respective (A2) to (F2) components, and other additives into an agitation vessel, and by agitating the contents normally at temperatures of 30 to 70° C., preferably 50 to 60° C. for a period of normally 1 to 6 hours, preferably 1 to 2 hours.

[Third Liquid Resin Composition]

The third liquid resin composition includes at least (A3) a compound represented by the aforementioned formula (3), (B3) a compound having phenolic hydroxyl group and/or phosphorous ester group, (C3) a cationic polymerizable compound, (D3) a radical polymerization initiator, (E3) a radical polymerizable compound, and (F3) polyether polyol compound. Components (A3) to (F3) and other arbitrary components, which are blended, if necessary, are explained below.

(The (A3) Component)

The (A3) component included in the third liquid resin composition is the compound having a structure represented by the following formula (3) and functions as a photo-cationic polymerization initiator similarly to the above (A1), (A2) components:

[Chemical 20]

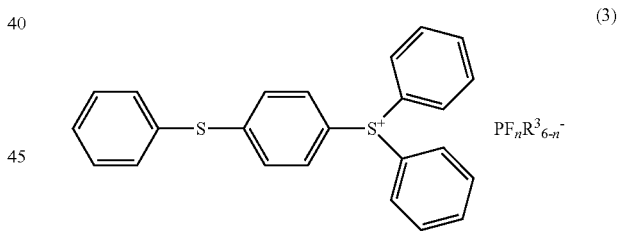

(3)

wherein $R^3$, if plural, is a monovalent organic group independently and at least one thereof is a monovalent aromatic group and n is an integer of 1 to 5.

The third liquid resin composition improves storage stability and inhibits viscosity increase over time through the inclusion of the compound having the structure represented by the aforementioned formula (3). Further, in the optically modeled article obtained from the liquid resin composition, a step on the side face between the respective laminated layers is reduced and further smooth surface is obtained. Further, because the compound having the structure represented by the aforementioned formula (3) does not include an element such as antimony, the liquid resin composition has further reduced toxicity.

Here, commercially available compound represented by the aforementioned formula (3) includes the compound represented by the following formula (4) as an impurity in many cases. In this case, the content of the compound represented by the following formula (4) is 1/20 or less (weight ratio) of the content of the compound represented by the aforementioned formula (3). With the arrangement, storage stability of the third liquid resin composition is further improved and viscosity increase over time can be inhibited. Further, a step on the side face between the respective laminated layers in an optically modeled article to be obtained is reduced and an optically modeled article having smoother surface can be obtained:

[Chemical 21]

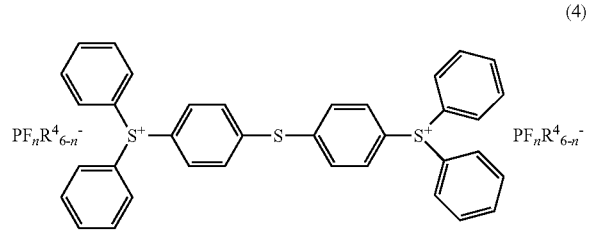

(4)

wherein $R^4$ is a monovalent organic group independently and at least one thereof is a monovalent aromatic group, and n is an integer of 1 to 5.

The content of the (A3) component in the third liquid resin composition is, per total content of the composition, preferably 0.1 to 10% by weight, more preferably 0.2 to 8% by weight, most preferably 1 to 8% by weight. If the content of the (A3) component is less than 0.1% by weight, radiation-curing property of the liquid resin composition decreases and a tridimensional object having sufficient mechanical strength cannot be modeled in some cases. On the other hands, if the content of the (A3) component is over 10% by weight, when the liquid resin composition is subjected to an optical tridimensional modeling method, it tends to be difficult to attain suitable optical transparency and to control curing depth, and modeling accuracy of, a tridimensional object to be obtained tends to decrease. If the compound represented by the aforementioned formula (4) is included, it is preferred that the total content of the compound represented by the aforementioned formula (3) and the compound represented by the aforementioned formula (4) satisfies the content of the above-mentioned (A3) component.

(The (B3), (C3), (D3), (E3), and (F3) Components)

The (B3) component is the same as the (B2) component included in the second liquid resin composition. Because the (B3) component is included in the third liquid resin composition, curing of the (E3) component (radical polymerizable compound) is inhibited certainly. Accordingly, polymerization of the (C3) component (cationic polymerizable compound) and the like proceeds gradually even after irradiation of light (delayed curing property). Thus, a step on the side face between the respective laminated layers of an optically modeled article to be obtained is reduced and, therefore, surface smoothness of the optically modeled article is improved.

Further, the (C3), (D3), (E3), and (F3) components in the third liquid resin composition are as the same as the (C1), (D1), (E1), and (G1) components included in the first liquid resin composition.

(Other Components)

Further, it is more preferred that the third liquid resin composition includes additionally elastomer particles having a number average particle size of 10 to 1000 nm, which is measured by an electron microscope method, as the (G3) component in addition to the (A3) to (F3) components. Through the inclusion of the (G3) component, impact resistance and resistance to fracture of a cured article obtained by irradiating light to the third liquid resin composition increase.

Examples of the (G3) component can comprise elastomer particles with the base component of polybutadiene, polyisoprene, butadiene-acrylonitrile copolymer, styrene-butadiene copolymer, styrene-isoprene copolymer, ethylene-propylene copolymer, ethylene-alpha-olefin copolymer, ethylene-alpha-olefin-polyene copolymer, acryl rubber, butadiene-(meth)acrylate copolymer, styrene-butadiene block copolymer, and styrene-isoprene block copolymer.

The (G3) component may be core/shell type particles and, of these above elastomer particles, specifically preferred ones are prepared by covering a core prepared by partially cross-linked polybutadiene, polyisoprene, styrene-butadiene copolymer, styrene-isoprene copolymer, butadiene-(meth) acrylate copolymer, styrene-butadiene block copolymer, styrene-isoprene block copolymer, and the like with methylmethacrylate polymer or methylmethacrylate-glycidylmethacrylate copolymer. As the commercially available core/shell type elastomer particles, there are Resinous Bond RKB (manufactured by Resinous Chemicals, Ltd.) and Techno MBS-6 and MBS-69, (manufactured by Techno Polymer Co., Ltd.).

The content of the (G3) component in the third liquid resin composition is, per total content of the composition, preferably 1 to 35% by weight, more preferably 2 to 20% by weight, most preferably 3 to 15% by weight. If the content of the (G3) component is less than 1% by weight, impact resistance and breaking toughness of a cured article tends to decrease. On the other hand, if the content of the (G3) component is over 35% by weight, viscosity of the composition tends to increase to generate bubbles during modeling and modeling accuracy of a tridimensional object to be obtained tends to decrease.

The third liquid resin composition may further include an additive such as a photo-sensitizer (polymerization accelerator) or a reactive diluent other than the above (G3) component, if necessary. As the additives such as a photo-sensitizer (polymerization accelerator) or a reactive diluent, the same ones as exemplified regarding the first liquid resin composition can be applied.

(Preparation of the Third Liquid Resin Composition)

The third liquid resin composition can be prepared by charging adequate content of the above respective (A3) to (G3) components, and other additives into an agitation vessel, and by agitating the contents normally at temperatures of 30 to 70° C., preferably 50 to 60° C. for a period of normally 1 to 6 hours, preferably 1 to 2 hours.

[Optically Modeled Article]

Then, preferred embodiments of the optically modeled article obtained through the above-mentioned liquid resin composition and the method for producing the same are explained.

The above liquid resin composition is preferably used as the liquid resin composition for the optical tridimensional modeling method. That is, a tridimensional object having a desired shape can be produced by using the optical tridimensional modeling method, in which lights such as visible light, ultraviolet light, and infrared light are selectively irradiated to the liquid resin composition, thus supplying energy necessary to cure the composition.

According to the liquid resin composition described above, good storage stability can be obtained and a tridimensional modeled article can be produced with a high degree of accuracy. The optically modeled article obtained has excellent characteristics, in that good transparency can be maintained for a long time because the degree of yellowing is less in high temperature environments, or surface smoothness is good because a step on the side face is reduced, depending on the kind of the liquid resin composition.

As described above, the optically modeled article according to the preferred embodiments is obtained by irradiating light to the above-mentioned liquid resin composition.

Means to selectively irradiate light to the liquid resin composition is not specifically limited, and varieties of means can be applied. Examples of the means are: (a) the one that irradiates light such as laser light or a light converged by a lens or a mirror to the composition while scanning the light; (b) the one that uses a mask which has a light transmitting section to allow a specific light pattern to pass through, thus irradiating the non-converged light to the composition via the mask; and (c) the one that uses a light-guide member fabricated by bundling pluralities of optical fibers which respond to a specified light pattern, thus irradiating the light to the composition via the light-guide. For the means (b) that uses a mask, it is possible to electro-optically form a mask image composed of the light-transmitting zone and the light-nontransmitting zone under a specified pattern utilizing the same principle as that of the liquid crystal display apparatus.

Regarding means described above, if the target tridimensional object has a fine portion or is requested to have high dimensional accuracy, the means to selectively irradiate light to the composition is preferably one that scans laser light having small spot-diameter.

The irradiated surface (such as scanning plane of converged light) on the resin composition held in a vessel may be any of the liquid surface of the resin composition and the contact surface with the wall of the light-transmitting vessel. When the liquid surface of the resin composition or the contact surface with the wall of the vessel is adopted as the irradiation plane of light, light can be irradiated directly from the outside the vessel or via the vessel wall.

According to the optical tridimensional modeling method, a specified portion of the resin composition is cured, and then the light-irradiating position (irradiated surface) is moved continuously or stepwise from the cured portion to the non-cured portion, thus laminating the cured portions to form the desired tridimensional shape. The movement of the irradiating position can be done by varieties of methods, such as: moving any of the light sources, the vessel holding the liquid resin composition, and the cured portion of the resin composition; and successively charging the resin composition to the vessel.

In the followings, a typical example of the optical tridimensional modeling method described above is explained. A supporting stage located in the vessel in an ascending/descending mode is lowered (immersed) to a slight depth below the liquid surface of the liquid resin composition, thus charging the resin composition onto the supporting stage to form the thin layer (1) of the resin composition. Then, light is selectively irradiated to the thin layer (1) to form the solid-state cured resin layer (1).

Subsequently, the liquid resin composition is charged onto the cured resin layer (1) to form the thin layer (2) of the composition. Light is selectively irradiated to the thin layer (2), thus forming the new cured resin layer (2) on the cured resin layer (1) so as to continuously and integrally laminate together.

Then, by repeating the steps for a specified number of cycles while varying or not varying the pattern of light irradiation, a tridimensional object having integrally-laminated cured resin layers (n) is modeled.

Thus obtained tridimensional object is taken out from the vessel. After removing the non-reacted resin composition left on the surface of the shape object, cleaning is applied as needed. Thus, an optically modeled article having a desired shape can be obtained.

Examples of cleaning agent are: alcohol-based organic solvent represented by alcohols such as isopropyl alcohol and ethyl alcohol; ketone-based organic solvent such as acetone, ethylacetate, and methylethylketone; aliphatic organic solvent represented by terpenes; and low viscosity thermosetting resin and radiation-curing resin.

Incidentally, post-curing may be conducted by using heat irradiation or light irradiation as needed after the cleaning with the cleaning agent. The post-curing cures a non-reacted resin composition remained in the surface and the inside of the tridimensional object, and stickiness of the surface of the modeled article can be suppressed and, further, initial strength of the modeled article can be improved.

EXAMPLES

In the followings, the present invention is explained in more detail by using Examples but the present invention is not limited to these Examples.
[Preparation of Liquid Resin Composition]

The respective components were charged to an agitation vessel according to the respective blending formula given in the Table 1 and agitated at 60° C. for 3 hours, and thus obtained were the respective liquid resin compositions according to Examples 1 to 10 and Comparative Examples 1 to 2. The blending formula in Table 1 is expressed by parts by weight.
[Used Components]

Respective components in Table 1 are as follows.
(A1) Component

Highly pure product of the compound represented by the aforementioned formula (1a): This highly pure product is obtained by refining of CPI-100A (trade name: manufactured by SAN-AFRO LIMITED) through recrystallization method using THF.

The CPI-100A is a mixture of (1) diphenyl(phenylthiophenyl)sulfonium hexafluoroantimonate, which is a compound represented by the formula (1a), and (2) bis[4-(diphenylsulfonio)phenyl) sulfidebishexafluoroantimonate, which is a compound represented by the formula (2a), in which the weight ratio of (2)/(1) is 1/50. The weight ratio of (2)/(1) of the highly pure product of CPT-100A was confirmed to be not less than 1/50 from the peak area ratio of HPLC.
(B1) Component Irganox 1010: Pentaerythrityl-tetrakis[3-(3,5-di-tert-butyl-4-hydroxyphenyl)propionate] (manufactured by Ciba Specialty Chemicals K.K.)
(C1-1) Component CELOXIDE 2021P: 3,4-Epoxycyclohexylmethyl-3',4'-epoxycyclohexyl carboxylate (manufactured by DAICEL CHEMICAL INDUSTRIES, LTD.)
(C1-2) Component Epolite 4000: Hydrogenated bisphenol A diglycidyl ether (manufactured by KYOEISHA CHEMICAL CO., LTD.)
(C1-3) Component Alonoxetane OXT-121: 1,4-Bis[(3-ethyl-3-oxetanylmethoxy)methyl]benzene (manufactured by TOA GOSEI CO., YID.)
(D) Component Irgacure 184: 1-Hydroxycyclohexylphenylketone (manufactured by Ciba Specialty Chemicals K.K.)

(E1-1) Component
SR399E: Dipentaerithritolmonohydroxypentaacrylate (manufactured by USA Sartomer Company Inc., TOMOE ENGINEERING CO.,LTD.)
(E1-2) Component
SR9003: Neopentylglycoldiacrylate (manufactured by USA Sartomer Company Inc., TOMOE ENGINEERING CO.,LTD.)
(E1-3) Component
DPHA: Dipentaerithritolhexaacrylate (manufactured by NIPPON KAYAKU CO., LTD.)
(F1-1) Component
2-Mercaptobenzothiazole (manufactured by Tokyo Chemical Industry Co., Ltd.)
(F1-2) Component
NOCCELER MDB: 2-(4-Morpholinodithiobenzothiazole (manufactured by OUCHI SHINKO CHEMICAL INDUSTRIAL CO., LTD.)
(F1-3) Component
Sanbit DX: Diisopropylxantogendisulfide (manufactured by SANSBIN CHEMICAL INDUSTRY CO.,LTD.)
(F 1-4) Component
Diphenyldisulfide (manufactured by Tokyo Chemical Industry Co., Ltd.)
(F') Component (Alternative Product of F1 Component)
NOCCELER DM: Dibenzothiadildisulfide (manufactured by OUCHI SHINKO CHEMICAL INDUSTRIAL CO., LTD.)
(G1) Component
Sunnix GP-600: Polyether polyol (manufactured by Sanyo Chemical Industries, Ltd.)
(H1) Component
Water

[Measurement of Content of the Compound Having a Structure Represented by the Formula (2)]

The content of the compound having a structure represented by the formula (2) in the liquid resin composition was, in each of Examples 1 to 10 and Comparative Examples 1 to 2, 1/796 in weight ratio to the compound having a structure represented by the aforementioned formula (1). This measurement method was as follows.

The liquid resin composition and methanol were well mixed at the volumetric ratio of 20:80 and, after being stood still for one hour, the supernatant liquid was filtrated with a filter of 0.45 μm to obtain a sample liquid. This sample liquid was analyzed with a High-performance liquid chromatography (Column: Intertsil Ph-3 type manufactured by GL Sciences, Inc., Carrier: methanol/water=95/5 (0.15% sodium perchlorate)). Then, from an area ratio (detected by a diode allay, analyzed at a wavelength of 300 nm) of peaks originated from the compound represented by the formula (1) and the compound represented by the formula (2) respectively, the content ratio of these compounds was calculated.

[Physical Property Evaluation]

By using each liquid resin composition of Examples 1 to 10 and Comparative Examples 1 to 2, storage stability thereof, and Young's modulus and yellowing inhibition in high temperature environments of the optically modeled article were evaluated. The evaluation result obtained was shown in Table 1. Each evaluation method is as follows.

(a) Storage Stability

100 Gram of each liquid resin composition was weighted, charged into a sample bottle and stood still in a constant-temperature unit at 80° C. After a lapse of 10 days, if viscosity of the liquid resin composition increased to 1.5 times or more of the initial value, the result was judged as "B", and if viscosity of the liquid resin composition was less than 1.5 times of the initial value, the result was judged as "A".

(b) Young's Modulus

Young's modulus of cured liquid resin composition each obtained in Examples or Comparative Examples was measured as follows. First, the liquid resin composition was applied onto a PET substrate by means of an applicator bar having a thickness of 381 μm, and cured by irradiating ultraviolet ray having energy of 1 J/cm$^2$ thereto to give a test film.

Next, Using the cured sample, a strip-shaped sample having a extended portion width of 6 mm and a extended portion length of 25 mm was produced. Then, tensile testing was conducted by means of tensile testing machine at a temperature of 23° C. and a humidity of 50% according to JTS K7127. The tensile rate was set to 1 mm/min and Young's modulus was calculated through a tensile strength at a distortion of 2.5%.

(c) Inhibition of Yellowing in High-Temperature Environments

First, by using the Solid Creator SCS-300P (manufactured by Sony Manufacturing Systems Corporation) and under the scanning rate condition of a laser power of 100 mW at an irradiated surface (liquid surface) and a curing depth of 0.2 mm for each composition, the laser was irradiated selectively to each liquid resin composition to form a cured resin layer (thickness: 0.10 mm), and this step was repeated to produce an optically modeled article.

Concerning each optically modeled article, YI values (yellow index) were measured by means of a minute area micro spetrocolorimeter (manufactured by NIPPON DENSHOKU INDUSTRIES CO., LTD.; VSS-300H type) immediately after the modeling and after being stood still for 2 hours at 80° C. Then, difference (ΔYI) between the YI values obtained immediately after the modeling and after being stood still for 2 hours at 80° C. was measured. If the ΔYI was 5 or less, the result was judged as "A", and if the ΔYI was over 5, the result was judged as "B".

TABLE 1

| Component | Example | | | | | | | | | | Comparative | |
|---|---|---|---|---|---|---|---|---|---|---|---|---|
| | 1 | 2 | 3 | 4 | 5 | 6 | 7 | 8 | 9 | 10 | 1 | 2 |
| A1 | 4 | 4 | 4 | 4 | 4 | 4 | 4 | 4 | 4 | 4 | 4 | 4 |
| B1 | 1.25 | 1.25 | 1.25 | 1.25 | 1.25 | 1.25 | 1.25 | 1.25 | 1.25 | 1.25 | 1.25 | 1.25 |
| C1-1 | 31.45 | 31.25 | 30.75 | 30.25 | 31.25 | 31.25 | 29.75 | 28.75 | 30.75 | 29.75 | 31.75 | 31.25 |
| C1-2 | 22 | 22 | 22 | 22 | 22 | 22 | 22 | 22 | 22 | 22 | 22 | 22 |
| C1-3 | 17 | 17 | 17 | 17 | 17 | 17 | 17 | 17 | 17 | 17 | 17 | 17 |
| D | 3 | 3 | 3 | 3 | 3 | 3 | 3 | 3 | 3 | 3 | 3 | 3 |
| E1-1 | 8 | 8 | 8 | B | 8 | 8 | 8 | 8 | 8 | 8 | 8 | 8 |
| E1-2 | 4 | 4 | — | — | 4 | 4 | 4 | 4 | 4 | 4 | 4 | 4 |
| E1-3 | — | — | 4 | 4 | — | — | — | — | — | — | — | — |
| F1-1 | 0.3 | 0.5 | 1 | 1.5 | — | — | — | — | — | — | — | — |
| F1-2 | — | — | — | — | 0.5 | — | — | — | — | — | — | — |

TABLE 1-continued

| Component | Example | | | | | | | | | | Comparative | |
|---|---|---|---|---|---|---|---|---|---|---|---|---|
| | 1 | 2 | 3 | 4 | 5 | 6 | 7 | 8 | 9 | 10 | 1 | 2 |
| F1-3 | — | — | — | — | — | 1 | 2 | 3 | — | — | — | — |
| F1-4 | — | — | — | — | — | — | — | — | 1 | 2 | — | — |
| F' | — | — | — | — | — | — | — | — | — | — | — | 0.5 |
| G1 | 9 | 9 | 9 | 9 | 9 | 9 | 9 | 9 | 9 | 9 | 9 | 9 |
| H1 | 1 | 1 | 1 | 1 | 1 | 1 | 1 | 1 | 1 | 1 | 1 | 1 |
| Total (parts by weight) | 101 | 101 | 101 | 101 | 101 | 101.5 | 101 | 101 | 101 | 101 | 101 | 101 |
| Tridimensional modeled article | | | | | | | | | | | | |
| Young's modulus (MPa) | 1800 | 1780 | 1600 | 1100 | 1800 | 1750 | 1700 | 1700 | 1800 | 1750 | 1700 | 1700 |
| Inhibition of turning yellow under high temperature environment | A | A | A | A | A | A | A | A | A | A | B | A |
| Liquid resin composition | | | | | | | | | | | | |
| Storage stability | A | A | A | A | A | A | A | A | A | A | A | B |

From table 1, in Examples 1 to 10, it was revealed that excellent storage stability of the liquid resin composition and yellowing-inhibiting effect of the optically modeled article n high-temperature environments were obtained.

On the other hands, it was confirmed that yellowing-inhibiting effect of the optically modeled article in high-temperature environments was inferior to the above because the component (F1) was not included in Comparative Example 1. In Comparative Example 2, storage stability of the liquid resin composition was inferior to the above because other antioxidant was included instead of the component (F1).

[Preparation of Liquid Resin Composition]

The respective components were charged to an agitation vessel according to the respective blending formula given in the Table 2 and agitated at 60° C. for 3 hours, and thus obtained were the respective liquid resin compositions according to Examples 11 to 14 and Comparative Examples 11 to 18. The blending formula in Table 2 is expressed by % by weight

[Used Components]

Respective components in Table 2 are as follows.

(A2-1) Component

CPI-100A (manufactured by SAN-APRO LIMITED): A mixture of diphenyl(phenylthiophenyl)sulfonium hexafluoroantimonate, which is a compound represented by the formula (la), and [4-(diphenylsulfonio)phenyl)sulfidebishexafluoroantimonate, which is a compound represented by the formula (2a), and the content ratio of the compound represented by the formula (2a) to weight (100% by weight) of the compound represented by the fonnula (1) was 2% by weight.

(A2-2) Component

UVI-6974 (manufactured by D.A.W. CHEMICAL CO., INC.): A mixture of (1) diphenyl(phenylthiophenyl)sulfonium hexafluoroantimonate, which is a compound represented by the formula (1a), and (2) [4-(diphenylsulfonio)phenyl)sulfidebishexafluoroantimonate, which is a compound represented by the formula (2a), and the content ratio of the compound represented by the formula (2a) to weight (100% by weight) of the compound represented by the formula (1) was 83% by weight.

(A') Component

SP-172 (manufactured by ADEKA CORPORATION): Photocationic polymerization initiator, which is not a compound represented by the formula (1a).

(B2-1) Component

Irganox1010 (manufactured by Ciba Specialty Chemicals K.K.): Pentaerythrityl-tetrakis[3-(3,5-di-tert-butyl-4-hydroxyphenyl)propionate]

(B2-2) Component

Irganox245 (manufactured by Ciba Specialty Chemicals K.K.): Triethyleneglycol-bis-[3-(3-tert-butyl-5-methyl-4-hydroxyphenyl)propionate]

(C2-1) Component

Hydrogenated bisphenol A diglycidyl ether (C2-2) Component

Neopentyiglycol diglycidylether (C2-3) Component 1,4-Bis[(3-ethyl-3-oxetanylmethoxy)methyl]benzene (D2) Component Irgacure 184 (manufactured by Ciba Specialty Chemicals K.K.): 1-Hydroxycyclohexylphenylketone (E2-1) Component Dipentaerithritolmonohydroxypentaacrylate (E2-2) Component Neopentylglycoldiacrylate (F2) Component Water

[Calculation of Rate of the Compound Represented by the Formula (2) and the Compound Represented by the Formula (1) in the Liquid Resin Composition]

Each liquid resin composition of Examples 11 to 14 and Comparative Examples 11 to 18 and methanol were well mixed at the volumetric ratio of 20:80 and, after being stood still for one hour, the supernatant liquid was filtrated with a filter of 0.45 μm to obtain a sample liquid. This sample liquid was analyzed with a High-performance liquid chromatography (Column: Intertsil Ph-3 type manufactured by GL Sciences, Inc., Carrier: methanoUwater=95/5 (0.15% sodium perchlorate)). Then, from an area ratio (detected by a diode allay, analyzed at a wavelength of 300 nm) of peaks originated from the compound represented by the formula (1) and the compound represented by the formula (2) respectively, the content ratio of these compounds was calculated. The results obtained from the liquid resin compositions according to each Examples and Comparative Examples were shown in Table 2.

[Physical Property Evaluation]

By using each liquid resin composition of Examples 11 to 14 and Comparative Examples 11 to 18, storage stability of the resin liquid, transparency of the optically modeled article (immediately after the modeling and after a lapse of time) were evaluated. The evaluation result obtained is shown in Table 2. Each evaluation method is as follows.

(a) Transparency of Optically Modeled Article type). If the YI was 7 or less, the result was judged as "A", and if the ΔYI was over 7, the result was judged as "B".

(b) Storage Stability of Liquid Resin Compositions

100 Gram of each liquid resin composition was weighted, charged into a sample bottle and stood still in a constant-temperature unit at 80° C. After a lapse of 10 days, if viscosity of the liquid resin composition increased to 1.5 times or more of the initial value, the result was judged as "B", and if viscosity of the liquid resin composition was less than 1.5 times of the initial value, the result was judged as "A",

TABLE 2

| Component | Example | | | | Comparative Example | | | | | | | |
|---|---|---|---|---|---|---|---|---|---|---|---|---|
| | 11 | 12 | 13 | 14 | 11 | 12 | 13 | 14 | 15 | 16 | 17 | 18 |
| A2-1 | 4.3 | 4.3 | 4.3 | 4.3 | 4.3 | — | — | — | 4.3 | — | — | — |
| A2-2 | — | — | — | — | — | 4.3 | — | — | — | 4.3 | — | — |
| A' | — | — | — | — | — | — | 4.3 | — | — | — | 4.3 | — |
| B2-1 | 1.25 | — | 1.25 | — | — | 1.25 | 1.25 | 1.25 | — | 1.25 | 1.25 | 1.25 |
| B2-2 | — | 1.25 | — | 1.25 | — | — | — | — | — | — | — | — |
| C2-1 | — | — | 52.25 | 52.25 | — | — | — | — | 52.25 | 52.25 | 52.25 | 52.25 |
| C2-2 | 10 | 10 | 10 | 10 | 10 | 10 | 10 | 10 | 10 | 10 | 10 | 10 |
| C2-3 | 16.5 | 16.5 | 16.5 | 16.5 | 16.5 | 16.5 | 16.5 | 16.5 | 16.5 | 16.5 | 16.5 | 16.5 |
| D2 | 3.2 | 3.2 | 3.2 | 3.2 | 3.2 | 3.2 | 3.2 | 3.2 | 3.2 | 3.2 | 3.2 | 3.2 |
| E2-1 | 8 | 8 | 8 | 8 | 8 | 8 | 8 | 8 | 8 | 8 | 8 | 8 |
| E2-2 | 4 | 4 | 4 | 4 | 4 | 4 | 4 | 4 | 4 | 4 | 4 | 4 |
| F2 | 0.5 | 0.5 | 0.5 | 0.5 | 0.5 | 0.5 | 0.5 | 0.5 | 0.5 | 0.5 | 0.5 | 0.5 |
| Total (part by weight) | 47.75 | 47.75 | 100 | 100 | 46.5 | 47.75 | 47.75 | 43.45 | 98.75 | 100 | 100 | 95.7 |
| Content (% by weight) of the compound represented by the formula (2) to the compound represented by the formula (1) Transparency of tridimensional modeled article | 2 | 2 | 2 | 2 | 2 | 83 | 2 | — | 2 | 83 | 2 | — |
| Immediately after the modeling | A | A | A | A | A | A | B | A | A | A | B | A |
| After a lapse of time Liquid resin composition | A | A | A | A | B | A | B | A | B | A | B | A |
| Storage stability | A | A | A | A | A | B | A | B | A | B | A | B |

First, by using the Solid Creator SCS-300P (manufactured by Sony Manufacturing Systems Corporation) and under the scanning rate condition of a laser power of 100 mW at an irradiated surface (liquid surface) and a curing depth of 0.2 mm for each composition, the laser was irradiated selectively to each liquid resin composition to form a cured resin layer (thickness: 0.10 mm), and this step was repeated to model a test piece for evaluation.

Subsequently, the test piece was taken out from the Solid Creator and washed to remove the liquid resin composition adhered on the outer surface. Then, the test piece was stood still at a constant temperature and humidity room at a temperature of 23° C. and a humidity of 50%.

After the modeling, the transparency was evaluated concerning the molded article after being stood still for 24 hours in the constant temperature and humidity room at a temperature of 23° C. and a humidity of 50% (immediately after the modeling) and the molded article after being stood still for 1 month under luminescent lights (after a lapse of time).

The evaluation of transparency was conducted by measuring YI on a surface of the modeled article by means of the minute area micro spetrocolorimeter (manufactured by NIPPON DENSHOKU INDUSTRIES CO., LTD.; VSS-300H According to the results in table 2, it is found that the liquid resin compositions of Examples 11 to 14 are superior in storage stability and transparency of the optically modeled article (immediately after the modeling and after a lapse of time).

On the other hands, in Comparative Examples 11 and 15, transparency of the optically modeled article after a lapse of time was inferior because the component (B2) was not included. In Comparative Examples 12 and 16, storage stability of the liquid resin composition was inferior because the content of the compound represented by the formula (2a) was over 5% by weight. Further, in Comparative Examples 13 and 17, transparency of the optically modeled article (immediately after the modeling and after a lapse of time) was inferior because other kind of photocationic polymerization initiator, which is not the (A2) component, was used. Further, in Comparative Examples 14 and 18, storage stability of the liquid resin composition was inferior because the (A2) component was not included.

[Preparation of Liquid Resin Composition]

The respective components were charged to an agitation vessel according to the respective blending formula given in the Table 3 indicated below and agitated at 60° C. for 3 hours, and thus obtained were the respective liquid resin compositions according to Examples 21 to 23 and Comparative Examples 21 to 23. The blending formula in Table 3 is expressed by % by weight.
[Used Components]
Respective components in Table 3 are as follows.
(A3) Component
Compound represented by the formula (1): A mixture of the compound represented by the formula (1) and the compound represented by the formula (2) but the content of the compound represented by the formula (2) is 1/20 or less.
(B3-1) Component
Irganox1010: Pentaerythrityl-tetrakis[3-(3,5-di-tert-butyl-4-hydroxyphenyl)propionate] (manufactured by Ciba Specialty Chemicals K.K.)
(B3-2) Component
Irganox1520L: 4,6-Bis(octylthiomethyl)-o-cresol (manufactured by Ciba Specialty Chemicals K.K.)
(B3-3) Component
Irganox245: Triethyleneglycol-bis-[3-(3-tert-butyl-5-methyl-4-hydroxyphenyl) propionate] (manufactured by Ciba Specialty Chemicals K.K.)
(B3-4) Component
Irgafos3 8: Bis[2,4-bis(1,1-dimethylethyl)-6-methylphenyl]ethyl ester phosphite (manufactured by Ciba Specialty Chemicals K.K.)
(B3-5) Component
Sumilizer GP: 6-[3-(3-tert-butyl-4-hydroxy-5-methylphenyl)-propoxy]-2,4,8,10-tetr-a-tert-butylbenz[d,f][1,3,2]-dioxaphosphepin (manufactured by Sumitomo Chemical Co. Ltd.)
(C3-1) Component
3,4-Epoxy cyclohexyl methyl-3',4'-epoxycyclohexylcarboxylate
(C3-2) Component
Bis (3,4-epoxycyclohexylmethyl)adipate
(C3-3) Component
Bisphenol A diglycidyl ether
(C3-4) Component
1,6-Hexanediol diglycidylether
(D3) Component
1-Hydroxycycl ohexylphenylketone
(E3) Component
Tris (acryloyloxyethyl)isocyanurate
(F3) Component
PO modified trimethylolpropane
(G3) Component
Elastomer particles (Resinous Bond RKB manufactured by Resinous Chemicals, Ltd.)
[Ratio of the Compound Represented by the Formula (2) and the Compound Represented by the Formula (1) Included in the Liquid Resin Composition]
Liquid resin composition of Examples 21 to 25 and Comparative Examples 21 to 23 and methanol were each well mixed at the volumetric ratio of 20:80 and, after being stood still for one hour, the supernatant liquid was filtrated with a filter of 0.45 µm to obtain a sample liquid. This sample liquid was analyzed with a High-performance liquid chromatography (Column: Intertsil Ph-3 type manufactured by GL Sciences, Inc., Carrier: methanol/water=95/5 (0.15% sodium perchlorate)). Then, from an area ratio (detected by a diode allay, analyzed at a wavelength of 300 nm) of peaks originated from the compound represented by the formula (1) and the compound represented by the formula (2) respectively, the content ratio of these compounds was calculated. The results obtained from the liquid resin compositions according to each Examples and Comparative Examples were shown in Table 3.

[Physical Property Evaluation]

By using each liquid resin composition of Examples 21 to 25 and Comparative Examples 21 to 23, storage stability of the resin liquid, delayed curing property, a step on the side face of the modeled article were evaluated. The result obtained in each evaluation is shown in Table 3.

(Delayed Curing Property)

For each liquid resin composition, the line image was formed using the Laser Modeling Machine SCS-300P (D-MEC Ltd.) in which a single cured line was prepared by drawing a single cycle of 4 cm in length applying a laser power of 100 mW on the irradiation plane (liquid surface) under the condition of about 70 mJ/cm$^2$ of irradiation amount of light giving 160 p.m of curing width at 870 mm/sec of scanning rate. Immediately after the irradiation and after a lapse of 20 minutes from the irradiation, respectively, the linear cured product was taken out from the resin liquid to measure the cured width and the cured depth using an optical microscope.

Then the increase of the cured depth $D_{20}$-$D_0$ was calculated, where $D_0$ signifies the cured depth immediately after the irradiation, and $D_{20}$ signifies the cured depth at 20 minutes after the irradiation. When the increase in the cured depth was 40 tm or more, the result was judged as A, when the cured depth was between 20 and 40 µm, the result was judged as B, and when the cured depth was not more than 20 µm, the result was judged as C.

(Step on the Side Face of the Modeled Article (µm))

First, by using the Solid Creator SCS-300P (manufactured by Sony Manufacturing Systems Corporation) and under the scanning rate condition of a laser power of 100 mW at an irradiated surface (liquid surface) and a curing depth of 0.2 mm for each composition, the laser was irradiated selectively to each liquid resin composition to form a cured resin layer (thickness: 0.10 mm), and this step was repeated to model a sample for evaluation.

Subsequently, the sample for evaluation was taken out from the Solid Creator and washed to remove the liquid resin composition adhered on the outer surface. Then, the test piece was stood still for 24 hours at a constant temperature and humidity room at a temperature of 23° C. and a humidity of 50%. The irregular portion (step) on the side face of the modeled article was measured by means of a laser microscope (OPTIPHOT-POL, manufactured by Nikon Corporation).

In Comparative Examples 22 and 23, the step on the side face of the modeled article could not be measured, because no tridimensional modeled article having sufficient mechanical strength could be obtained or because the tridimensional modeled article could not be produced with accuracy due to insufficient optical transparency, for example.

(Storage Stability)

100 Gram of each liquid resin composition was weighted, charged into a sample bottle and stood still in a constant-temperature unit at 80° C. After a lapse of 10 days, if viscosity of the liquid resin composition increased to 1.5 times or more of the initial value, the result was judged as "B", and if viscosity of the liquid resin composition was less than 1.5 times of the initial value, the result was judged as "A".

TABLE 3

| Component | Example 21 | Example 22 | Example 23 | Example 24 | Example 25 | Comparative Example 21 | Comparative Example 22 | Comparative Example 23 |
|---|---|---|---|---|---|---|---|---|
| A3 | 4.62 | 4.57 | 4.57 | 4.62 | 4.62 | 4.67 | 0.05 | 12.82 |
| B3-1 | 1.15 | — | — | — | — | — | — | — |
| B3-2 | — | 2.28 | — | — | — | — | — | — |
| B3-3 | — | — | 2.28 | — | — | — | — | — |
| B3-4 | — | — | — | 1.15 | — | — | — | — |
| B3-5 | — | — | — | — | 1.15 | — | — | — |
| C3-1 | 23.09 | 22.83 | 22.83 | 23.09 | 23.09 | 23.36 | 24.5 | 21.37 |
| C3-2 | 27.71 | 27.4 | 27.4 | 27.71 | 27.71 | 28.04 | 29.4 | 25.64 |
| C3-3 | 8.31 | 8.22 | 8.22 | 8.31 | 8.31 | 8.41 | 8.82 | 7.69 |
| C3-4 | 3.7 | 3.65 | 3.65 | 3.7 | 3.7 | 3.74 | 3.92 | 3.42 |
| D3 | 1.85 | 1.83 | 1.83 | 1.85 | 1.85 | 1.87 | 1.96 | 1.71 |
| E3 | 12.01 | 11.87 | 11.87 | 12.01 | 12.01 | 12.15 | 12.74 | 11.11 |
| F3 | 8.31 | 8.22 | 8.22 | 8.31 | 8.31 | 8.41 | 8.82 | 7.69 |
| G3 | 9.24 | 9.13 | 9.13 | 9.24 | 9.24 | 9.35 | 9.8 | 8.55 |
| Total | 100 | 100 | 100 | 100 | 100 | 100 | 100 | 100 |
| Content ratio of the compound represented by the formula (2)/the compound represented by the formula (1) | 1/50 | 1/50 | 1/50 | 1/50 | 1/50 | 1/50 | 1/50 | 1/50 |
| Delayed curing property | A | A | A | A | A | C | C | C |
| Step on the side face of laminated layers of the modeled article (μm) | 6 | 7 | 6 | 7 | 6 | 15 | unmeasurable | unmeasurable |
| Storage stability | A | A | A | A | A | A | A | B |

From table 3, in Examples 21 to 25, good delayed curing property could be obtained, the step on the side face of laminated layers of the modeled article was small, and superior storage property could be obtained. On the other hands, it was found that, in Comparative Examples 21 to 23 in which the (B3) component was not included, delayed curing property was inferior and the step on the side face of laminated layers of the modeled article was large. In Comparative Examples 22 and 23, the step on the side face of the laminated layers of the modeled article could not be measured, because no tridimensional modeled article having sufficient mechanical strength could be obtained or because the tridimensional modeled article could not be produced with good accuracy due to insufficient transparency, for example.

The invention claimed is:

1. A radiation-curing liquid resin composition for optical tridimensional modeling comprising:
   a compound represented by the general formula (1) described below;

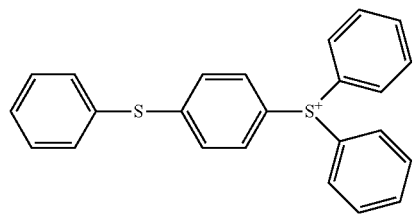

(1)

a compound having phenolic hydroxyl group;
   a cationic polymerizable compound;
   a radical polymerization initiator;
   a radical polymerizable compound;
   one or more sulfur compound selected from the group consisting of 2-mercaptobenzothiazole, 2-(4-morpholinodithio)benzothiazole, diisopropylxanthogen disulfide and diphenyldisulfide; and
   a polyether polyol compound wherein the compound represented by the general formula (1) contains as an impurity a compound represented by the following formula (2) at 5% or less by weight per weight of the compound represented by the aforementioned formula (1).

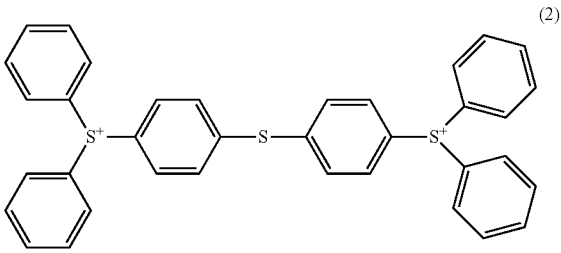

(2)

2. The radiation-curing liquid resin composition for optical tridimensional modeling according to claim 1, wherein, per total content of the composition,
   the content rate of the compound represented by the formula (1) is 0.1 to 10% by weight,
   the content rate of the compound having phenolic hydroxyl group is 0.1 to 10% by weight,
   the content rate of the cationic polymerizable compound is 15 to 85% by weight,
   the content rate of the radical polymerization initiator is 0.01 to 10% by weight,
   the content rate of the radical polymerizable compound is 0.1 to 25% by weight,
   the content rate of the sulfur compound is 0.2 to 3% by weight, and
   the content rate of the polyether polyol compound is 1 to 35% by weight.

3. A radiation-curing liquid resin composition for optical tridimensional modeling comprising:
   a compound represented by general formula (1) described below;

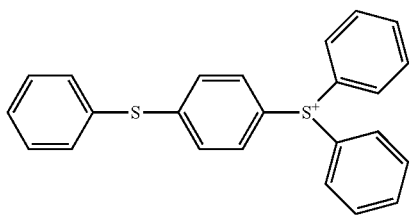

(1)

a compound having phenolic hydroxyl group and/or phosphorous ester group;
a cationic polymerizable compound;
a radical polymerization initiator;
a radical polymerizable compound; and
water; wherein the compound represented by the general formula (1) contains as an impurity a compound represented by the following formula (2) at 5% or less by weight per weight of the compound represented by the aforementioned formula (1).

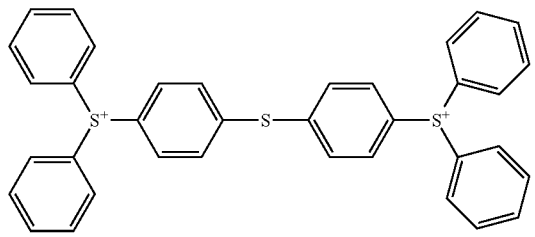

(2)

4. The radiation-curing liquid resin composition for optical tridimensional modeling according to claim 3, wherein,
per total content of the composition,
the content rate of the compound represented by the formula (1) is 0.1 to 10% by weight,
the content rate of the compound having phenolic hydroxyl group and/or phosphorous ester group is 0.1 to 10% by weight,
the content rate of the cationic polymerizable compound is 15 to 85% by weight,
the content rate of the radical polymerization initiator is 0.01 to 10% by weight,
the content of the radical polymerizable compound is 0.1 to 25% by weight, and
the content rate of the water is 0.1 to 2% by weight.

5. A radiation-curing liquid resin composition for optical tridimensional modeling comprising:
a compound represented by the general formula (3) described below;

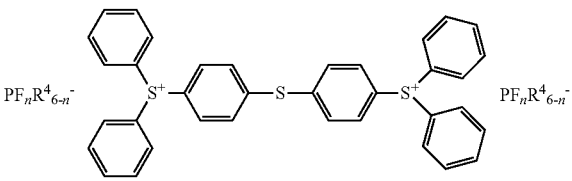

(3)

wherein $R^3$, if plural, is a monovalent organic group independently and at least one thereof is a monovalent aromatic group and n is an integer of 1 to 5;
a compound having phenolic hydroxyl group and/or phosphorous ester group;
a cationic polymerizable compound;
a radical polymerization initiator;
a radical polymerizable compound; and
a polyether polyol compound
wherein the compound represented by the general formula (3) contains as an impurity a compound represented by the following formula (4) at 5% or less by weight per weight of the compound represented by the aforementioned formula (3):

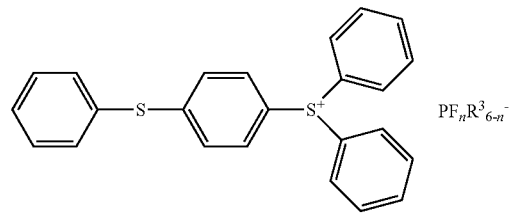

(4)

wherein $R^4$ is a monovalent organic group independently and at least one thereof is a monovalent aromatic group, and n is an integer of 1 to 5.

6. The radiation-curing liquid resin composition for optical tridimensional modeling according to claim 5, wherein,
per total content of the composition,
the content rate of the compound represented by the formula (3) is 0.1 to 10% by weight,
the content rate of the compound having phenolic hydroxyl group and/or phosphorous ester group is 0.1 to 10% by weight,
the content rate of the cationic polymerizable compound is 15 to 85% by weight,
the content rate of the radical polymerization initiator is 0.01 to 10% by weight,
the content rate of the radical polymerizable compound is 0.1 to 25% by weight, and
the content rate of the a polyether polyol compound is 1 to 35% by weight.

7. The radiation-curing liquid resin composition for optical tridimensional modeling according to claim 5, further containing 1 to 35% by weight of elastomer particles having number average particle sizes of 10 to 1000 nm measured by electron microscope method, per total content of the composition.

8. The radiation-curing liquid resin composition for optical tridimensional modeling according to claim 1, wherein the compound having phenolic hydroxyl group is at least one compound selected from the group consisting of the compounds represented by the (5) to (6) described below:

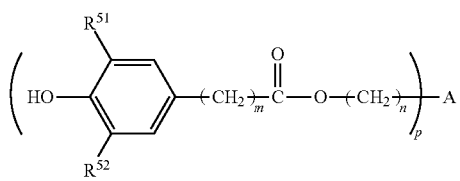

(5)

wherein $R^{51}$ and $R^{52}$ are independently alkyl groups having a carbon number of 1 to 4, which may be branched; m and n are independently 1 or 2, p is 1 to 4; and A is an organic group;

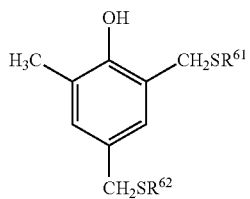

(6)

wherein $R^{61}$ and $R^{62}$ are independently alkyl groups having a carbon number of 6 to 10, which may be branched.

9. The radiation-curing liquid resin composition for optical tridimensional modeling according to claim 1, wherein the compound having phenolic hydroxyl group is pentaerythritol-tetrakis[3-(3,5-di-tert-butyl-4-hydroxyphenyl)propionate].

10. The radiation-curing liquid resin composition for optical tridimensional modeling according to claim 1, wherein the cationic polymerization compound contains 40% or more by weight of compound having two or more alicyclic epoxy groups in a single molecule, per total content of the cationic polymerization compound.

11. An optically modeled article obtained by irradiating light to the radiation-curing liquid resin composition for optical tridimensional modeling according to claim 1.

* * * * *